United States Patent
Miyazaki et al.

(10) Patent No.: US 10,297,040 B2
(45) Date of Patent: May 21, 2019

(54) IMAGE PROCESSING METHOD, IMAGE PROCESSING APPARATUS AND MEDIUM STORING IMAGE PROCESSING PROGRAM

(71) Applicant: FUJITSU LIMITED, Kawasaki-shi, Kanagawa (JP)

(72) Inventors: Nobuhiro Miyazaki, Kawasaki (JP); Eigo Segawa, Kawasaki (JP); Kentaro Tsuji, Kawasaki (JP); Mingxie Zheng, Kawasaki (JP); Yuji Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/652,734

(22) Filed: Jul. 18, 2017

(65) Prior Publication Data

US 2018/0047181 A1    Feb. 15, 2018

(30) Foreign Application Priority Data

Aug. 10, 2016   (JP) .................................. 2016-157702

(51) Int. Cl.
| | |
|---|---|
| G06K 9/00 | (2006.01) |
| G06K 9/46 | (2006.01) |
| G06K 9/62 | (2006.01) |
| G06T 7/70 | (2017.01) |
| G06T 7/11 | (2017.01) |

(52) U.S. Cl.
CPC ............ G06T 7/70 (2017.01); G06K 9/00295 (2013.01); G06K 9/4604 (2013.01); G06K 9/6215 (2013.01); G06T 7/11 (2017.01); G06T 2207/30196 (2013.01)

(58) Field of Classification Search
CPC ... G06T 7/70; G06T 7/11; G06T 2207/30196; G06K 9/00295; G06K 9/4604; G06K 9/6215

See application file for complete search history.

(56) References Cited

U.S. PATENT DOCUMENTS 9,165,369 B1 * 10/2015 Zhang ................... G06T 7/0081
2008/0100709 A1    5/2008 Furukawa
(Continued)

FOREIGN PATENT DOCUMENTS

| JP | 2004-94518 A | 3/2004 |
|---|---|---|
| JP | 2008-26974 A | 2/2008 |

(Continued)

*Primary Examiner* — Jon Chang
(74) *Attorney, Agent, or Firm* — Westerman, Hattori, Daniels & Adrian, LLP

(57) ABSTRACT

An image processing method for tracking an object, the method includes: specifying a first range in which a first target is searched for and a second range in which a second target is searched for in a next frame by referring to a storage device that stores past frames captured by a capturing device; changing the first range and/or the second range in the next frame such that an area in which the first range and the second range specified in the next frame overlap each other is less than a predetermined value in a case where the overlapping area is equal to or greater than the predetermined value; and searching for, in the changed first range and the changed second range, and specifying a region corresponding to the first target and a region corresponding to the second target in the next frame.

15 Claims, 22 Drawing Sheets

(56) References Cited

U.S. PATENT DOCUMENTS

2012/0051594 A1* 3/2012 Kim .................. G06K 9/00771
                                              382/103
2015/0179219 A1* 6/2015 Gao .................. G06K 9/00664
                                              386/278

FOREIGN PATENT DOCUMENTS

| JP | 2008-112210 A | 5/2008 |
| JP | 2011-180684 A | 9/2011 |
| JP | 2012-108798 A | 6/2012 |

* cited by examiner

FIG. 7

| TIME | FRAME |
|---|---|
| 1 | FRAME OF TIME "1" |
| 2 | FRAME OF TIME "2" |
| 3 | FRAME OF TIME "3" |
| ... | ... |

| PERSON ID | TIME [FRAME] | PERSON REGION ||||| MOVEMENT AMOUNT (x, y) |
|---|---|---|---|---|---|---|
| | | x COORDINATES [PIXEL] | y COORDINATES [PIXEL] | WIDTH [PIXEL] | HEIGHT [PIXEL] | |
| 10A | 19 | 10 | 20 | 16 | 60 | (2, 7) |
| | 20 | 12 | 27 | 17 | 62 | |
| 10B | 31 | 128 | 200 | 30 | 98 | (−8, −10) |
| | 32 | 120 | 190 | 27 | 96 | |
| ... | ... | ... | ... | ... | ... | ... |
| N | 86 | 73 | 81 | 20 | 71 | (1, 3) |
| | 87 | 74 | 84 | 21 | 71 | |

142

IMAGE PROCESSING METHOD, IMAGE PROCESSING APPARATUS AND MEDIUM STORING IMAGE PROCESSING PROGRAM

CROSS-REFERENCE TO RELATED APPLICATION

This application is based upon and claims the benefit of priority of the prior Japanese Patent Application No. 2016-157702, filed on Aug. 10, 2016, the entire contents of which are incorporated herein by reference.

FIELD

The embodiment discussed herein is related to an image processing program.

BACKGROUND

In recent years, a monitoring camera is used in many purposes of use such as a marketing or traffic volume survey in addition to a monitoring purpose. For example, merchandise purchased by the person is estimated by analyzing a movement path of a person based on image data captured by a monitoring camera of a shopping center, and the estimated merchandise information is used for marketing.

For example, in the related art, the same person is tracked by determining that a head candidate estimated using a particle filter is a head by using a classifier and repeatedly performing a process of positioning the head of the person. Examples of the related art include Japanese Laid-open Patent Publication Nos. 2012-108798, 2008-112210, 2004-94518, 2011-180684, and 2008-26974.

However, in the related arts, there is a problem that it is difficult to reduce erroneous determination of a position of a target.

According to one aspect, an object of the present disclosure is to provide an image processing program, an image processing method, and an image processing apparatus which are capable of reducing erroneous determination of a position of a target.

SUMMARY

According to an aspect of the invention, an image processing method includes: specifying a first range in which a first target is searched for and a second range in which a second target is searched for in a next frame by referring to a storage device that stores past frames captured by a capturing device, in a case where a first region corresponding to the first target and a second region corresponding to the second target are extracted from a preceding frame captured by the capturing device; changing the first range and/or the second range in the next frame such that an area in which the first range and the second range specified in the next frame overlap each other is less than a predetermined value in a case where the overlapping area is equal to or greater than the predetermined value; and searching for, in the changed first range and the changed second range, and specifying a region corresponding to the first target and a region corresponding to the second target in the next frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a data structure of an image table;

FIG. 8 is a diagram illustrating an example of a data structure of a tracking table;

DESCRIPTION OF EMBODIMENT

Hereinafter, an embodiment of an image processing program, an image processing method, and an image processing apparatus disclosed in the present application will be described in detail with reference to the drawings. The present disclosure is not limited by the embodiment.

Embodiment

A reference example in which a movement path of a person is determined will be described before the present embodiment is described. This reference example is not the related art. An image processing apparatus according to the reference example performs a tracking process after a position prediction process is performed.

Figure 1:
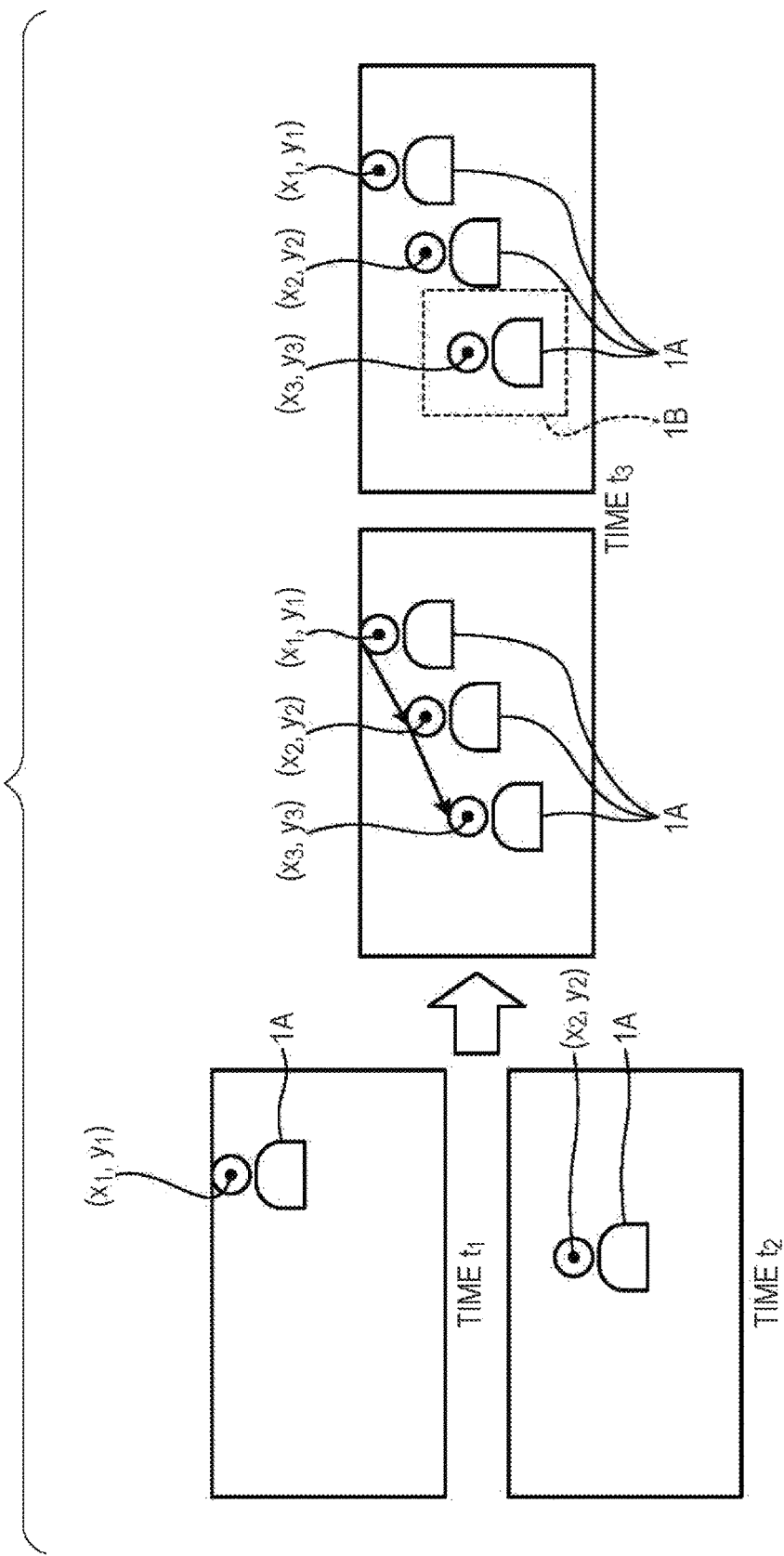
FIG. 1 is a first diagram for describing a reference example in which a movement path of a person is determined.
Figure 2:
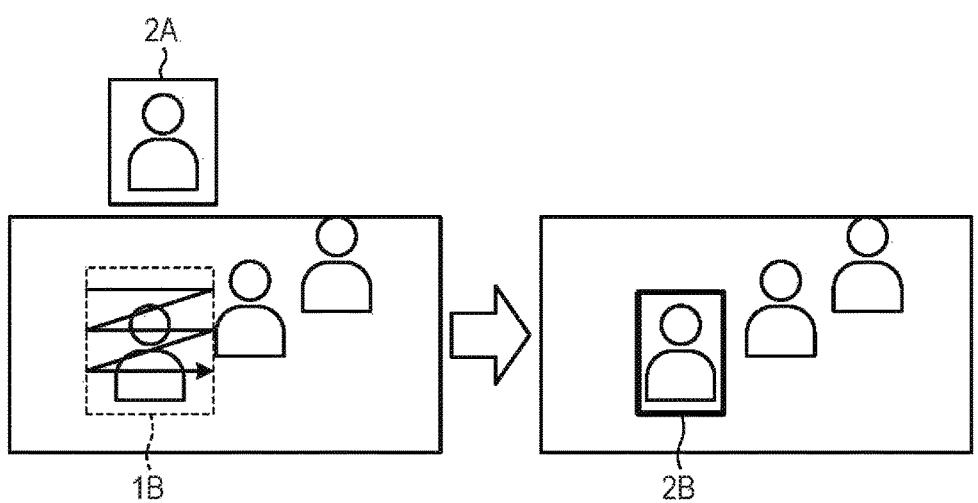
FIG. 2 is a second diagram for describing the reference example in which the movement path of the person is determined.

FIGS. 1 and 2 are diagrams for describing the reference example in which the movement path of the person is determined. The position prediction process according to the reference example will be described with reference to FIG. 1. It is assumed that a position of a person 1A is specified in times $t_1$ and $t_2$. It is assumed that the position of the person 1A in the time $t_1$ is $(x_1, y_1)$ and the position of the person 1A in the time $t_2$ is $(x_2, y_2)$.

The image processing apparatus according to the reference example assumes that the person 1A straightly moves, and predicts a position $(x_3, y_3)$ of the person 1A in a time $t_3$. In the example illustrated in FIG. 1, the image processing apparatus sets a range including the position $(x_3, y_3)$ as a search range 1B.

The tracking process according to the reference example will be described with reference to FIG. 2. It is assumed that the search range 1B is set based on the position prediction process of FIG. 1. The image processing apparatus acquires a feature 2A of the person 1A from a storage unit. The feature 2A of the person 1A is a feature of the person 1A detected from image data of the preceding frame, and is, for example, a feature of the person 1A in the time $t_2$.

A region 2B having a high degree of similarity between the search range 1B and the feature 2A of the person 1A is specified by comparing the feature 2A and the search range 1B of the person, and the specified region 2B is determined as a region of the person 1A in the time $t_3$. The image processing apparatus according to the reference example tracks the person 1A by repeatedly performing the position prediction process and the tracking process.

Figure 3:
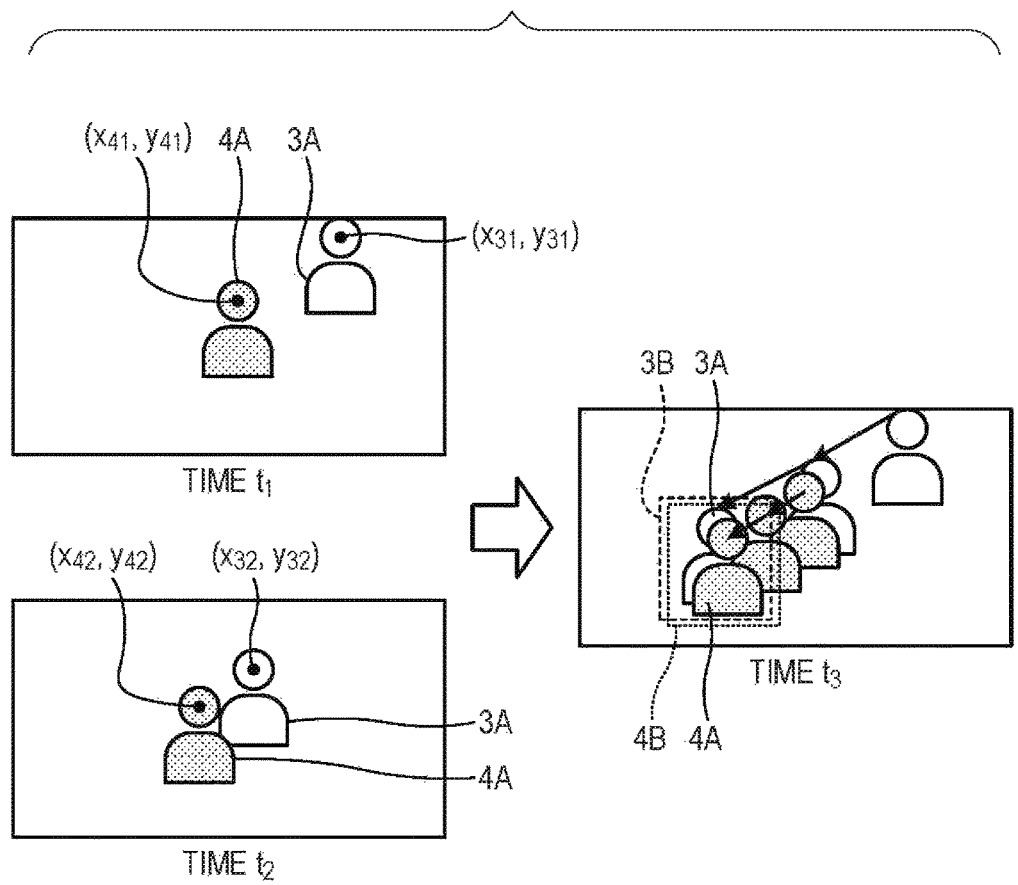
FIG. 3 is a first diagram for describing a problem of the reference example.
Figure 4:
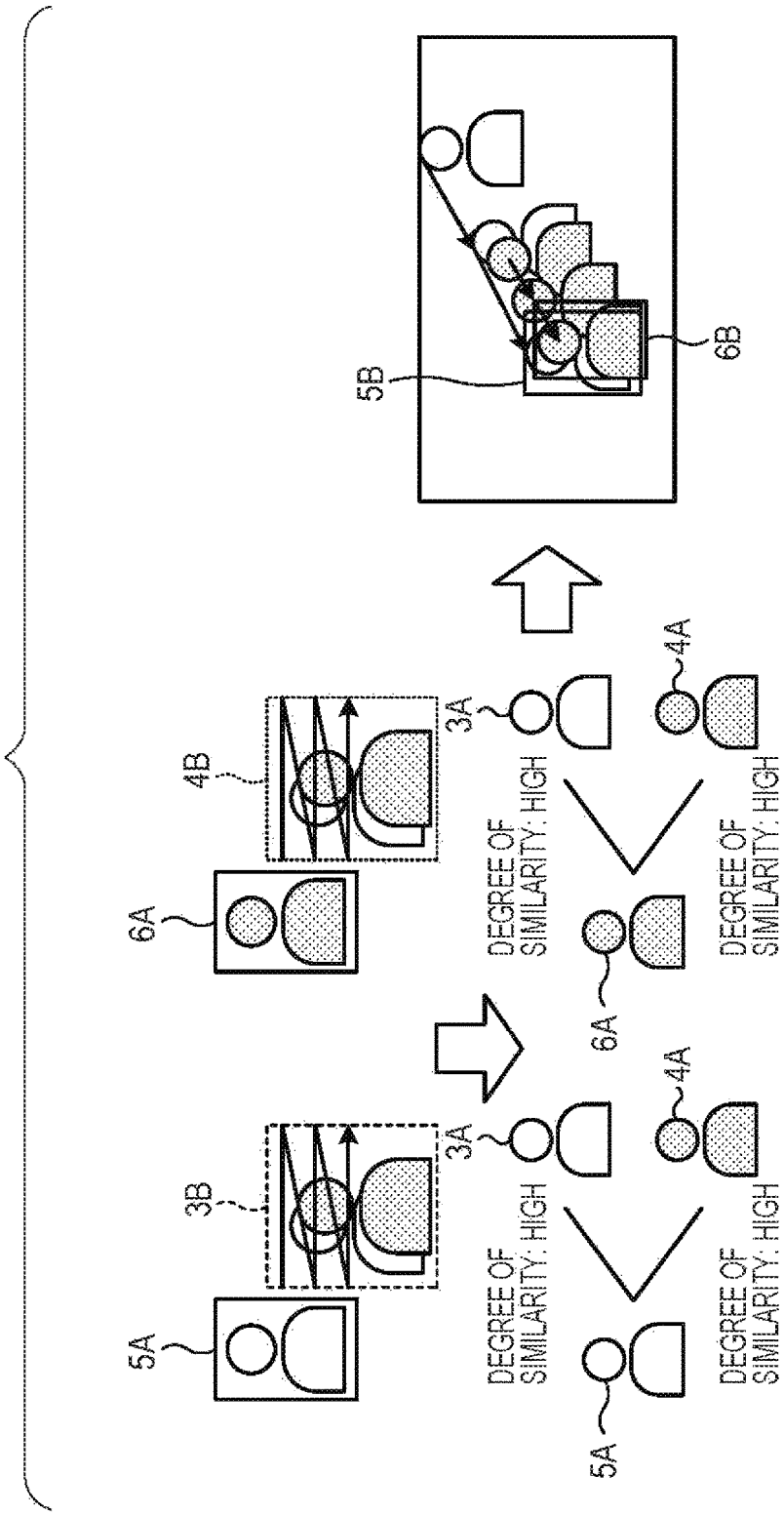
FIG. 4 is a second diagram for describing the problem of the reference example.

Next, problems of the reference example will be described. FIGS. 3 and 4 are diagrams for describing problems of the reference example. Initially, the problems of the reference example will be described with reference to FIG. 3. It is assumed that positions of persons 3A and 4A are specified in the time $t_1$ and $t_2$. It is assumed that a position of the person 3A in the time $t_1$ is $(x_{31}, y_{31})$ and a position of the person 3A in the time $t_2$ is $(x_{32}, y_{32})$. It is assumed that a position of the person 4A in the time $t_1$ is $(x_{41}, y_{41})$ and a position of the person 4A in the time $t_2$ is $(x_{42}, y_{42})$.

Similarly to the process described in FIG. 1, the image processing apparatus according to the reference example assumes that the person 3A straightly moves, and sets a range including a position of the person 3A in the time $t_3$, as a search range 3B. The image processing apparatus assumes that the person 4A straightly moves, and sets a range including a position of the person 4A in the time $t_3$, as a search range 4B.

The problems of the reference example will be described with reference to FIG. 4. The image processing apparatus acquires a feature 5A of the person 3A from the storage unit. The feature 5A of the person 3A is a feature of the person 3A detected from image data in the preceding frame, and is, for example, a feature of the person 3A in the time $t_2$.

The image processing apparatus determines a region having a high degree of similarity between the search range 3B and the feature 5A of the person 3A, as a region of the person 3A in the time $t_3$. However, if the features of the person 3A and the person 4A are similar to each other and the search ranges 3B and 4B overlap each other over a predetermined region or more, a region 6B of the person 4A may be determined as the region of the person 3A, and thus, the tracking process is not able to be appropriately performed on the person 3A.

Similarly, the image processing apparatus acquires a feature 6A of the person 4A from the storage unit. The feature 6A of the person 4A is a feature of the person 4A detected from image data in the preceding frame, and is, for example, a feature of the person 4A in the time $t_2$.

The image processing apparatus determines a region having a high degree of similarity between the search range 4B and the feature 6A of the person 4A, as a region of the person 4A in the time $t_3$. However, if the features of the person 3A and the person 4A are similar to each other and the search ranges 3B and 4B overlap each other over a predetermined area or more, a region 5B of the person 3A may be determined as the region of the person 4A, and thus, the tracking process is not able to be performed on the person 4A.

Figure 5:
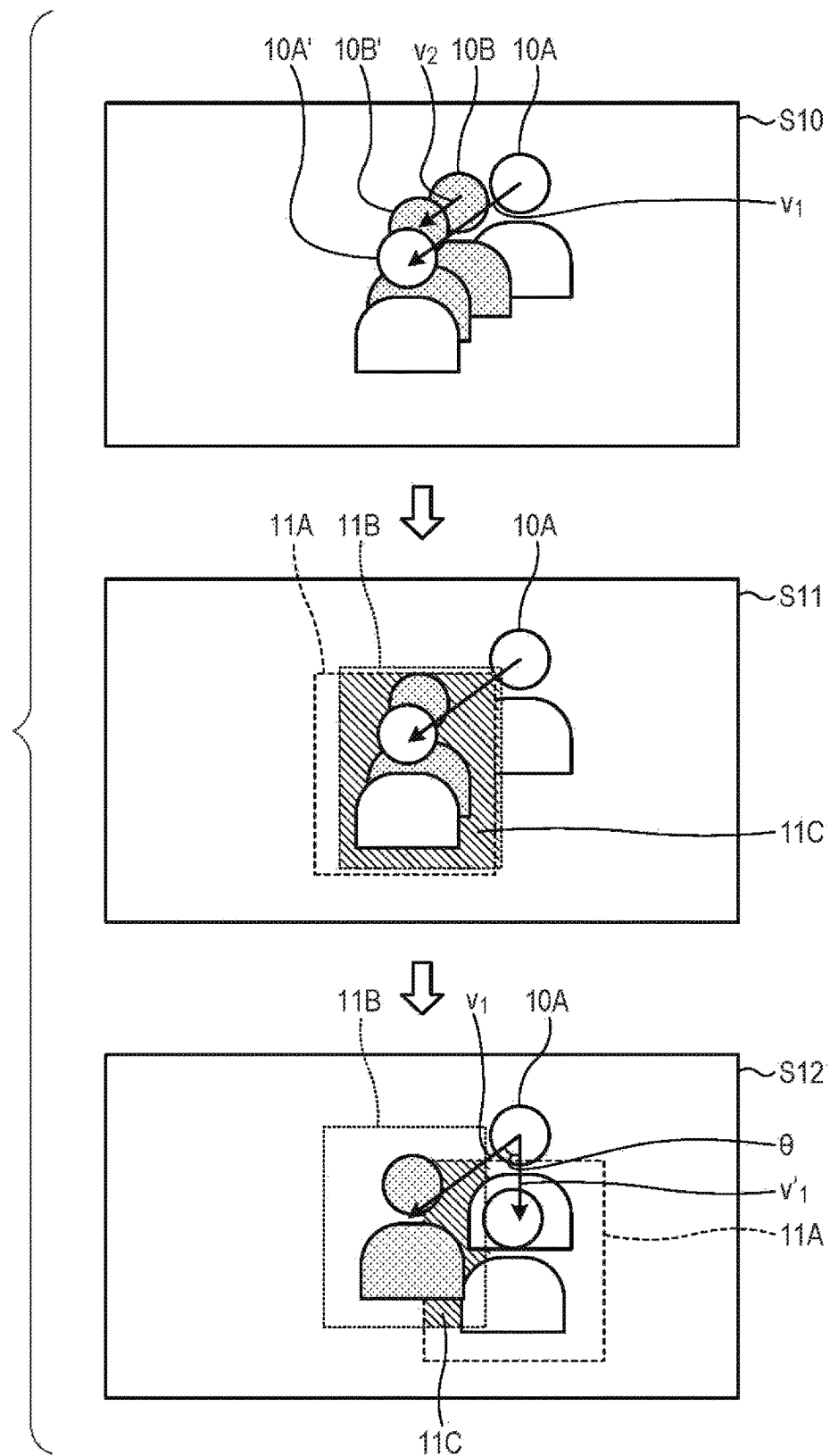
FIG. 5 is a diagram for describing a process of an image processing apparatus according to the present embodiment.

Hereinafter, an image processing apparatus according to the present embodiment will be described. FIG. 5 is a diagram for describing a process of the image processing apparatus according to the present embodiment. Step S10 of FIG. 5 will be described. It is assumed that persons 10A and 10B exist in a frame of image data captured in a certain time. The image processing apparatus assumes that the persons 10A and 10B straightly move at an equal velocity, and estimates positions in a next frame from the past movement velocities of the persons 10A and 10B.

For example, the movement velocity (velocity vector) of the person is defined by Expression (1).

$$v=(p_x(t-1)-p_x(t-2),p_y(t-1)-p_y(t-2)) \quad (1)$$

In Expression (1), $p_x(t)$ indicates an x coordinate of the person in the time t. $p_y(t)$ indicates a y coordinate of the person in the time t. For example, the position coordinates of the person in the time t is defined by Expression (2).

$$p(t)=(p_x(t),p_y(t)) \quad (2)$$

The image processing apparatus predicts the position coordinates of the persons 10A and 10B in the next frame based on the movement velocities of the persons 10A and 10B. For example, if a movement amount and a movement direction of the person 10A in a unit time (a time between the frames) is $v_1$ (velocity), the position coordinates of the person 10A in the next frame are position coordinates 10A'. If a movement amount and a movement direction of the person 10B in a unit time (a time between the frames) is $v_2$ (velocity), the position coordinates of the person 10B in the next frame are position coordinates 10B'.

Step S11 of FIG. 5 will be described. The image processing apparatus sets a search range 11A with the predicted position coordinates 10A' of the person 10A as its reference. The image processing apparatus sets a search range 11B with the predicted position coordinates 10B' of the person 10B as its reference.

The image processing apparatus determines whether or not "overtaking conditions 1 and 2" to be represented below are satisfied. The image processing apparatus determines that the overtaking is performed in a case where both the overtaking conditions 1 and 2 are satisfied, and proceeds to a process of step S12. The image processing apparatus determines that the overtaking is not performed in a case where both the overtaking conditions 1 and 2 are not satisfied, and performs the same process as the tracking process according to the reference example. In a case where the overtaking is not performed, even though the tracking process according to the reference example is performed, the problems illustrated in FIGS. 3 and 4 are not caused. The following conditions are conditions for determining whether or not the person 10A overtakes the person 10B as illustrated in FIG. 5.

Overtaking condition 1: signs of $v_1$ and $v_2$ are equal to each other in x and y coordinate directions and $v_1$ is greater than $v_2$.

Overtaking condition 2: $w \geq w_0$ and $h \geq h_0$ in a case where a vertical width of an overlapping region 11C of the search range 11A and the search range 11B is h and a horizontal width thereof is w. $w_0$ and $h_0$ are preset thresholds, and correspond to sizes of the person regions.

Step S12 of FIG. 5 will be described. In a case where it is determined that the overtaking is performed, the image processing apparatus adjusts a direction of a velocity of the person having a higher velocity such that a direction of an estimated position of the person having the high velocity and the original movement direction is smallest and an overlapping region with a search range of another person is smaller than the person region. An adjusting target is the direction, and an absolute value of the velocity is not to be changed.

Specifically, the image processing apparatus change a direction of a velocity vector v1 and repeatedly performs a process of resetting the search range 11A until the horizontal width w of the overlapping region 11C is equal to or less than $w_0$ or until the vertical width h of the overlapping region 11C is equal to or less than $h_0$. In a case where there is a plurality of velocity vectors satisfying that the horizontal width w of the overlapping region 11C is equal to or less than $w_0$ or the vertical width h of the overlapping region 11C is equal to or less than $h_0$, the image processing apparatus specifies a velocity vector $v_1'$ satisfying that an angle θ formed by the original velocity vector and the changed velocity vector is minimized. The image processing apparatus sets the search range 11A by the velocity vector $v_1'$, and performs the tracking process.

As described in steps S10 to S12 of FIG. 5, the image processing apparatus according to the present embodiment adjusts predicted position coordinates of a person who overtakes on a captured screen by paying attention to the fact that the person who overtakes moves while avoiding a person who is overtaken when the persons actually move. An overlapping region of a search range of the person who overtakes and a search range of the person who is overtaken is smaller than the person region by adjusting the position coordinates in this manner, and thus, it is possible to suppress the change of the person. Accordingly, it is possible to appropriately perform the tracking process.

Figure 6:
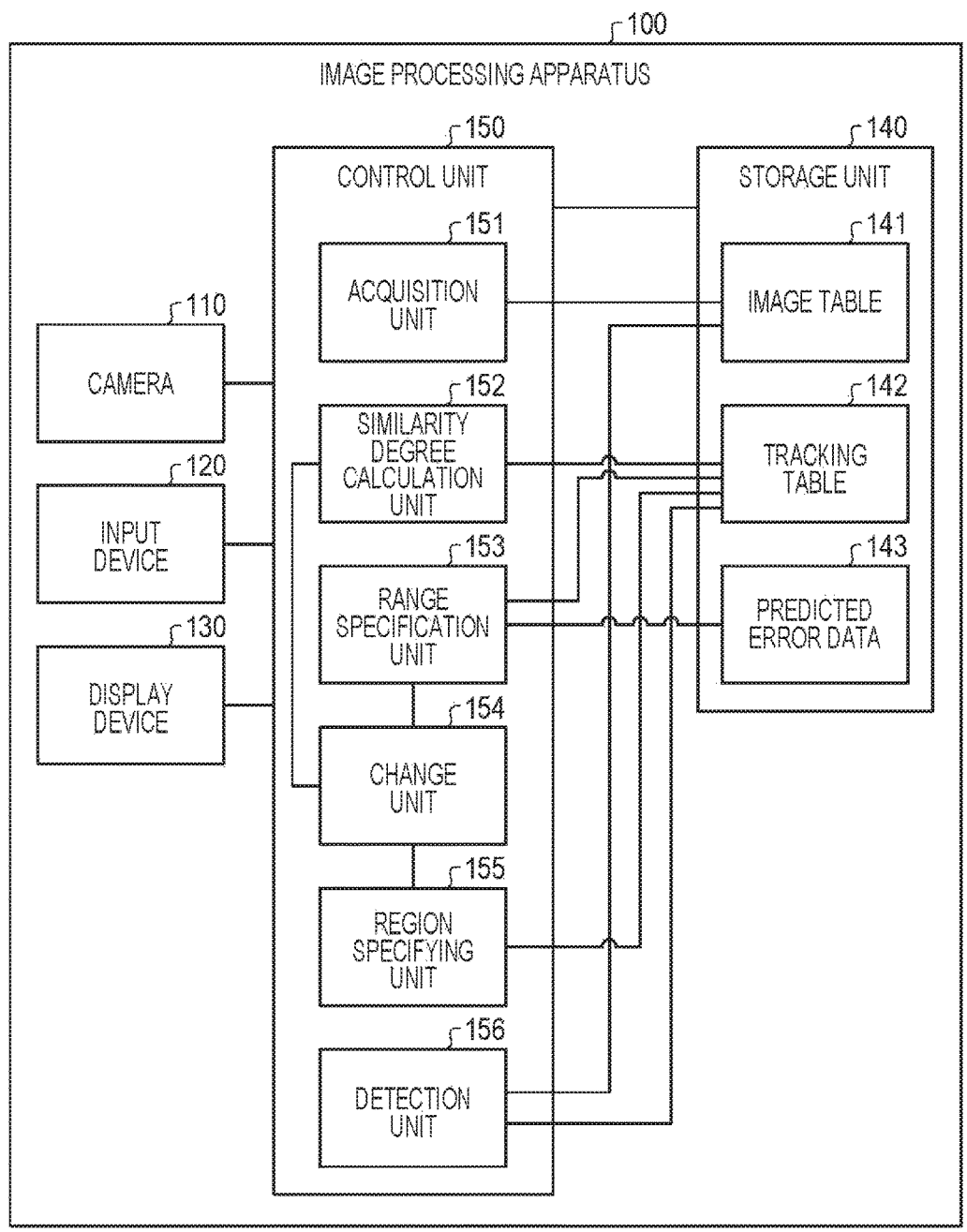
FIG. 6 is a functional block diagram illustrating a configuration of the image processing apparatus according to the present embodiment.

Next, a configuration of the image processing apparatus according to the present embodiment will be described. FIG. 6 is a functional block diagram illustrating the configuration of the image processing apparatus according to the present embodiment. As illustrated in FIG. 6, the image processing apparatus 100 includes a camera 110, an input device 120, a display device 130, a storage unit 140, and a control unit 150.

The camera 110 is a device that captures an image of a capture range, and outputs data of the captured image to the image processing apparatus 100. In the following description, the data of the image captured by the camera 110 is described as image data. The image data is data of which the frames of the respective times are continuous. Although not illustrated in FIG. 6, the camera 110 may be connected to the image processing apparatus 100 via a network.

The input device 120 is an input device for inputting various information items to the image processing apparatus 100. The input device 120 corresponds to a keyboard, a mouse, or a touch panel.

The display device 130 is a display device that displays a processing result of the control unit 150. The display device 130 corresponds to a liquid crystal display or a touch panel.

The storage unit 140 includes an image table 141, a tracking table 142, and predicted error data 143. The storage unit 140 corresponds to a semiconductor memory device such as a random access memory (RAM), a read only memory (ROM), or a flash memory, or a storage device such as a hard disk drive (HDD).

The image table 141 is a table that stores the frames of the respective times included in the image data. FIG. 7 is a diagram illustrating an example of a data structure of the image table. As illustrated in FIG. 7, the image table 141 correlates a time and a frame. As stated above, the image data captured by the camera 110 includes the frames continuous for the respective times.

The tracking table 142 is a table that retains various information items related to a person as a tracking target. FIG. 8 is a diagram illustrating an example of a data structure of the tracking table. As illustrated in FIG. 8, the tracking table 142 correlates person identification (ID), a time, a person region, and a movement amount. The person ID is information for uniquely identifying the person. The time indicates a time of the frame. Although only two frames are illustrated for each person in FIG. 8, many frames are actually stored for each person.

The person region indicates a region on a frame in which the person exists. The person region includes an x coordinate, a y coordinate, a width, and a height. The x coordinate and the y coordinate correspond to an x coordinate and a y coordinate at an upper left of the person region. The width corresponds to a width of the person region, and the height corresponds to a height of the person region. The x coordinate and the y coordinate are not limited to the x coordinate and the y coordinate at the upper left of the person region, and may be an x coordinate and a y coordinate at a upper right, a lower left, a lower right, or a center of the person region.

A movement amount (x, y) indicates a movement amount in an x-axis direction and a y-axis direction in which the person moves per unit time. The movement amount (x, y) corresponds to the velocity vector. For example, it is assumed that the unit time is a time from a frame of a time t−1 to a frame of a time t.

The predicted error data 143 is information indicating an error between estimated position coordinates of a certain person and actual position coordinates of the certain person. The details related to the predicted error data 143 will be described below.

The control unit 150 includes an acquisition unit 151, a similarity degree calculation unit 152, a range specifying unit 153, a change unit 154, a region specifying unit 155, and a detection unit 156. The control unit 150 corresponds to an integrated device such as an application specific integrated circuit (ASIC) or a field programmable gate array (FPGA). For example, the control unit 150 corresponds to an electronic circuit such as a central processing unit (CPU) or a micro processing unit (MPU).

The acquisition unit 151 is a processing unit that acquires the image data from the camera 110. The acquisition unit 151 correlates the frames included in the image data with the times, and stores the correlated items in the image table 141.

The similarity degree calculation unit 152 is a processing unit that calculates a degree of similarity of each person region in a case where there is a plurality of person regions in a next frame. The similarity degree calculation unit 152 outputs data of the degree of similarity of each person region to the change unit 154. The similarity degree calculation unit 152 calculates a degree of similarity for each group of two different person regions in a case where there are three or more person regions in the next frame.

Figure 9:
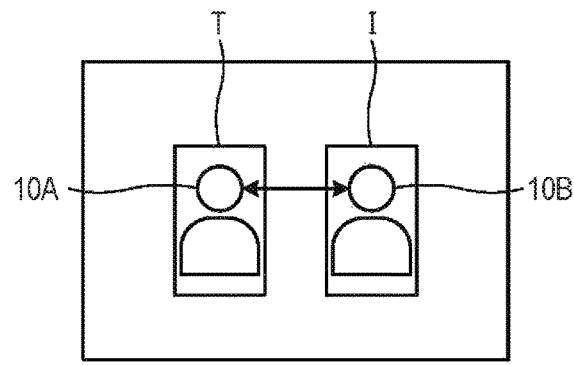
FIG. 9 is a diagram for describing a process of a similarity degree calculation unit.

For example, the similarity degree calculation unit 152 calculates a value of a normalized cross correlation function as a degree of similarity. Specifically, the similarity degree calculation unit 152 calculates a degree of similarity R of each person region based on Expression (3). FIG. 9 is a diagram for describing a process of the similarity degree calculation unit. As illustrated in FIG. 9, it is assumed that a region T of the person 10A and a region I of the person 10B are present in the next frame. T(x, y) in Expression (3) represents a pixel value of the coordinates (x, y) included, in the region T. I(x, y) represents a pixel value of the coordinates (x, y) included in the region I. h corresponds to a height of the region T or the region I. w corresponds to a width of the region T or the region I.

$$R(x, y) = \frac{\sum_{y'=0}^{h-1} \sum_{x'=0}^{w-1} T(x', y') I(x+x', y+y')}{\sqrt{\sum_{y'=0}^{h-1} \sum_{x'=0}^{w-1} T(x', y')^2 \sum_{y'=0}^{h-1} \sum_{x'=0}^{w-1} I(x+x', y+y')^2}} \quad (3)$$

The similarity degree calculation unit 152 repeatedly performs the process of calculating the degree of similarity on the group of person regions included in the next frame. For example, the similarity degree calculation unit 152 outputs information acquired by correlating the time of the frame, the person IDs corresponding to the group of person regions, and the degree of similarity to the change unit 154.

The range specifying unit 153 is a processing unit that specifies a first range in which a first person is searched for and a second range in which a second person is searched for in the next frame based on the tracking table 142. The range specifying unit 153 performs a position estimation process and a range calculation process to be described below.

The position estimation process performed by the range specifying unit 153 will be described. The range specifying unit 153 calculates a movement amount of a person from position coordinates of the person in the past frame, and estimates position coordinates of the person in the next frame.

Figure 10:
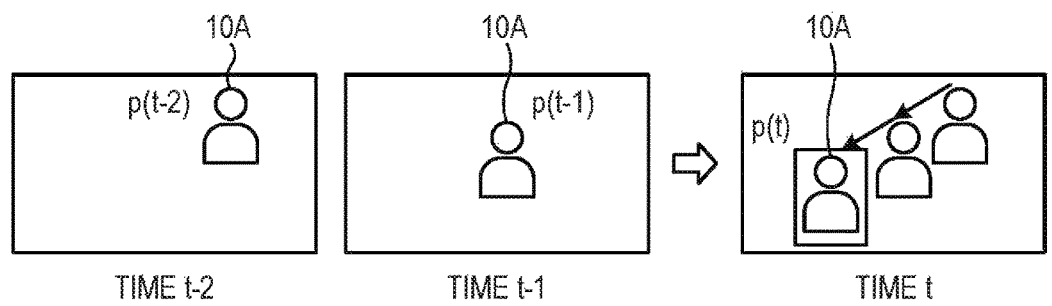
FIG. 10 is a first diagram for describing a process of a range specifying unit.

FIG. 10 is a first diagram for describing a process of the range specifying unit. It is assumed that position coordinates p(t-1) and p(t-2) of the person in the two past frames in a camera coordinate system are stored in the tracking table 142 through the past processes. Here, it is assumed that a person is, for example, the person 10A. Position coordinates p(t-2) correspond to position coordinates of the person 10A in a time t-2. Position coordinates p(t-1) correspond to position coordinates of the person 10A in a time t-1. Here, p(t) is defined by Expression (2).

The movement amount (velocity vector) per unit time of the person 10A is defined by Expression (4). The range specifying unit 153 assumes that the person 10A straightly moves at a uniform velocity, and estimates the position coordinates p(t) of the person 10A in the time t by Expression (5).

$$\Delta = p(t-1) - p(t-2) \quad (4)$$

$$p(t) = p(t-1) + \Delta \quad (5)$$

Next, the range calculation process performed by the range specifying unit 153 will be described. The range specifying unit 153 sets a search range with the position coordinates p(t) specified through the position estimation process as its reference.

Figure 11:
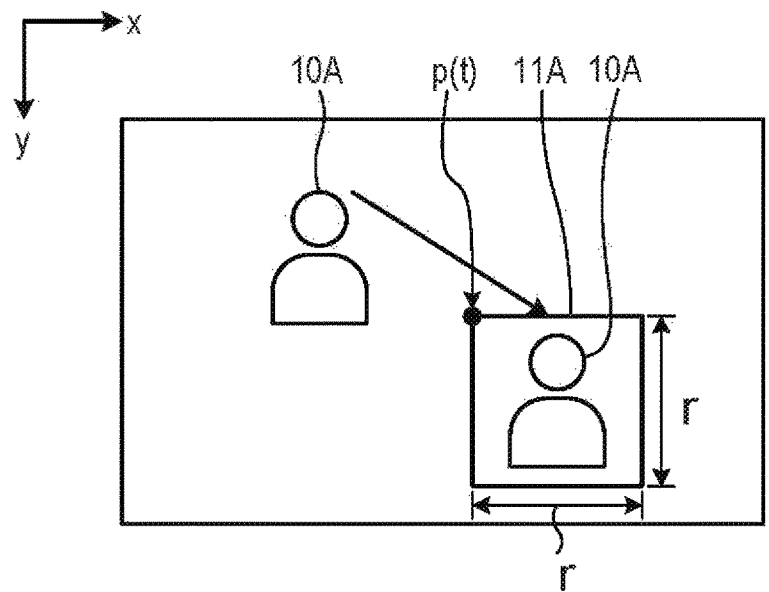
FIG. 11 is a second diagram for describing the process of the range specifying unit.

FIG. 11 is a second diagram for describing a process of the range specifying unit. The range specifying unit 153 sets a search range 11A having a horizontal width r and a vertical width r based on the position coordinates p(t). For example, the range specifying unit 153 sets the search range 11A such that an upper left end of the search range 11A is positioned in the position coordinates p(t).

Subsequently, the range specifying unit 153 modifies the search range 11A in consideration of a predicted error $\varepsilon(\varepsilon_x, \varepsilon_y)$. The range specifying unit 153 acquires the predicted error $\varepsilon(\varepsilon_x, \varepsilon_y)$ from the predicted error data 143.

Figure 12:
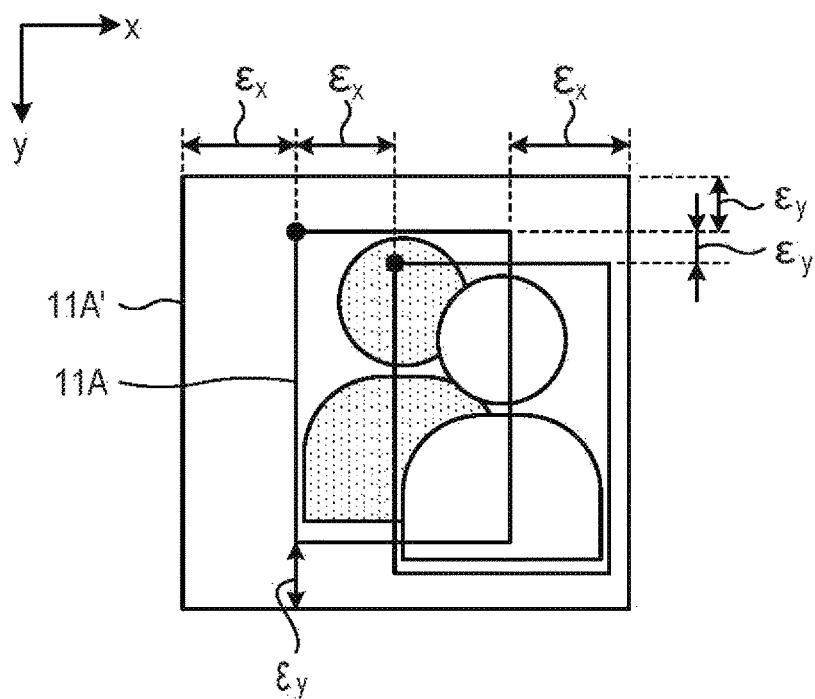
FIG. 12 is a third diagram for describing the process of the range specifying unit.

FIG. 12 is a third diagram for describing a process of the range specifying unit. The predicted errors corresponds to an error between the position coordinates of the person 10A estimated based on Expression (5) and the actual position coordinates of the person 10A. For example, the range specifying unit 153 modifies the search range 11A to be a search range 11A' by expanding the horizontal width of the search range 11A by only $2\varepsilon_x$ and expanding the vertical width thereof by only $\varepsilon_y$. The search range 11A is modified to be the search range 11A', and thus, the person region can be included in the search range 11A' without omission. In the description other than the range specifying unit 153, the modified search range 11A' is simply described as the search range 11A.

For example, the predicted error $\varepsilon_x$ is defined by Expression (6). The predicted error $\varepsilon_y$ is defined by Expression (7). x of Expression (6) corresponds to the x coordinate of the person 10A estimated based on Expression (5). y of Expression (6) corresponds to the y coordinate of the person 10A estimated based on Expression (5).

$$\varepsilon_x = x \times (1 - p_x) \quad (6)$$

$$\varepsilon_y = y \times (1 - p_y) \quad (7)$$

$p_x$ of Expression (6) is a value defined by Expression (8). $p_y$ of Expression (7) is a value defined by Expression (9).

$$p_x = \frac{(p_{x1} + p_{x2} + p_{x3} + \dots)}{M} \quad (8)$$

$$p_y = \frac{(p_{y1} + p_{y2} + p_{y3} + \dots)}{M} \quad (9)$$

$p_{x1}$ and $p_{y1}$ of Expression (8) and Expression (9) are prediction accuracy of a certain person (for example, person 10A), and are defined by Expressions (10) and (11), respectively.

$$p_{x1} = \frac{(x_{p1} + x_{p2} + x_{p3} + \dots)}{N} \quad (10)$$

-continued $$p_{y1} = \frac{(y_{p1} + y_{p2} + y_{p3} + \ldots)}{N} \quad (11)$$

"$x_{p1}, x_{p2}, x_{p3}, \ldots$" included in Expression (10) and "$y_{p1}, y_{p2}, y_{p3}, \ldots$" included in Expression (11) are defined by Expressions (12) to (17). In Expressions (12) to (17), $x_1(t)$ indicates the actual x coordinate of the person detected from the frame in the time t. $y_1(t)$ indicates the actual y coordinate of the person detected from the frame in the time t. $x_2(t)$ indicates the predicted x coordinate of the person detected from the frame in the time t. $y_2(t)$ indicates the predicted y coordinate of the person detected from the frame in the time t.

$$x_{p1}=1-\{|x_1(t-2)-x_2(t-2)|/x_1(t-2)\} \quad (12)$$

$$y_{p1}=1-\{|y_1(t-2)-y_2(t-2)|/y_1(t-2)\} \quad (13)$$

$$x_{p2}=1-\{|x_1(t-1)-x_2(t-1)|/x_1(t-1)\} \quad (14)$$

$$y_{p2}=1-\{|y_1(t-1)-y_2(t-1)|/y_1(t-1)\} \quad (15)$$

$$x_{p3}=1-\{|x_1(t)-x_2(t)|/x_1(t)\} \quad (16)$$

$$x_{p3}=1-\{|y_1(t)-y_2(t)|/y_1(t)\} \quad (17)$$

$px_2$ and $py_2$ of Expressions (8) and (9) are prediction accuracy of another person (for example, person 10B), and are defined similarly to Expressions (10) and (11). $px_3$ and $py_3$ of Expressions (8) and (9) are prediction accuracy of another person (for example, person 10C which is not illustrated), and are defined similarly to Expressions (10) and (11).

It is assumed that the range specifying unit 153 previously calculates the actual position coordinates of the persons 10A to 10C and another person and the position coordinates estimated based on Expression (5) and calculates the predicted errors $\varepsilon_x$ and $\varepsilon_y$. The range specifying unit 153 registers data of the predicted errors $\varepsilon_x$ and $\varepsilon_y$ as the predicted error data 143 in the storage unit 140.

The range specifying unit 153 outputs information acquired by correlating the person ID, the position coordinates of the person in the time t−1 which correspond to the person ID, the movement amount (velocity vector), and the search range to the change unit 154.

In a case where an area in which the search range 11A of the person 10A specified in the next frame and the search range 11B of the person 10B overlap each other is equal to or greater than a predetermined value, the change unit 154 is a processing unit that changes a position of the search range 11A or the search range 11B such that the overlapping area is less than the predetermined value.

Initially, the change unit 154 determines whether or not change the position of the search range 11A or the search range 11B by determining whether or not both the overtaking conditions 1 and 2 are satisfied.

As mentioned above, the overtaking condition 1 is a condition in which the "signs of $v_1$ and $v_2$ in the x and y coordinate directions are equal to each other or a value of $v_2$ is 0". Here, if it is assumed that the person who overtakes is the person 10A and the person who is overtaken is the person 10B, the movement amount of the person 10A corresponds to "$v_1$" and the movement amount of the person 10B corresponds to "$v_2$". For example, the change unit 154 compares the movement amounts of the persons, and determines that a person having a larger movement amount is the person who overtakes and a person having a smaller movement amount is the person who is overtaken.

The overtaking condition 2 is a condition in which the "$w \geq w_0$ and $h \geq h_0$ in a case where the vertical width of the overlapping region 11C of the search range 11A and the search range 11B is h and the horizontal width thereof is w. $w_0$ and $h_0$ are preset thresholds, and correspond to sizes of the person region".

Figure 13:
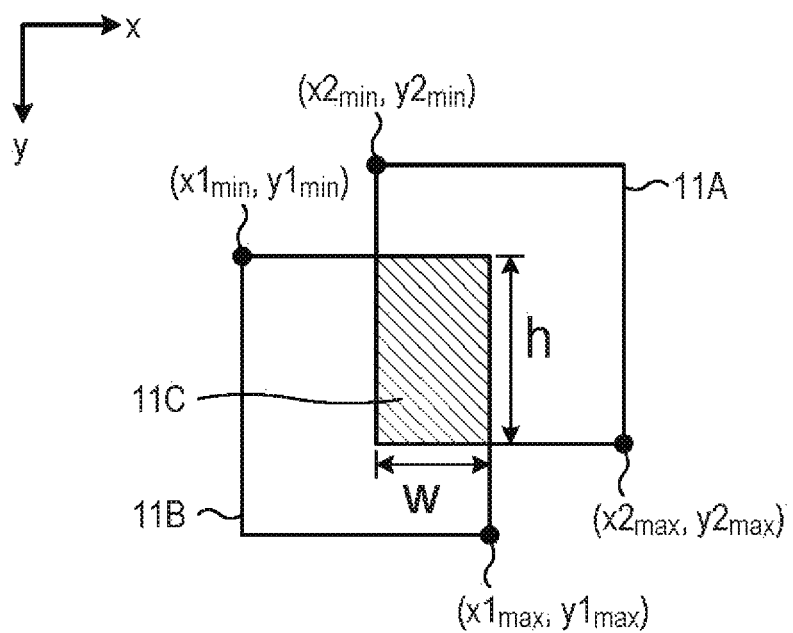
FIG. 13 is a first diagram for describing a process of a change unit.

FIG. 13 is a first diagram for describing a process of the change unit. In a coordinate system illustrated in FIG. 13, it is assumed that as the position becomes closer to the right side, the x coordinate becomes larger, and as the position becomes closer to the lower side, the y coordinate becomes larger. As illustrated in FIG. 13, it is assumed that coordinates of an upper left end of the search range 11B are $(x1_{min}, y1_{min})$ and coordinates of a lower right end thereof are $(x1_{max}, y1_{max})$. It is assumed that coordinates of an upper left end of the search range 11A are $(x2_{min}, y2_{min})$ and coordinates of a lower right end thereof are $(x2_{max}, y2_{max})$.

The width w of the overlapping region 11C is defined by Expression (18). The height h of the overlapping region 11C is defined by Expression (19). min(x, y) included in Expressions (18) and (19) means that a smaller value of x and y is selected. max(x, y) means that a larger value of x and y is selected. The change unit 154 calculates the width w and the height h of the overlapping region 11C based on Expressions (18) and (19).

$$w=\min(x1_{max}, x2_{max})-\max(x1_{min}, x2_{min}) \quad (18)$$

$$h=\min(y1_{max}, y2_{max})-\max(y1_{min}, y2_{min}) \quad (19)$$

In a case where both the overtaking conditions 1 and 2 are not satisfied, the change unit 154 skips the process of changing the position of the search range 11A or the search range 11B. That is, in a case where both the overtaking conditions 1 and 2 are not satisfied, it is assumed that the change unit 154 maintains the position of the search range 11A or the search range 11B.

Meanwhile, in a case where both the overtaking conditions 1 and 2 are satisfied, the change unit 154 performs the process of changing the position of the search range 11A or the search range 11B. Here, for example, a case where the position of the search range 11A is changed will be described.

Figure 14:
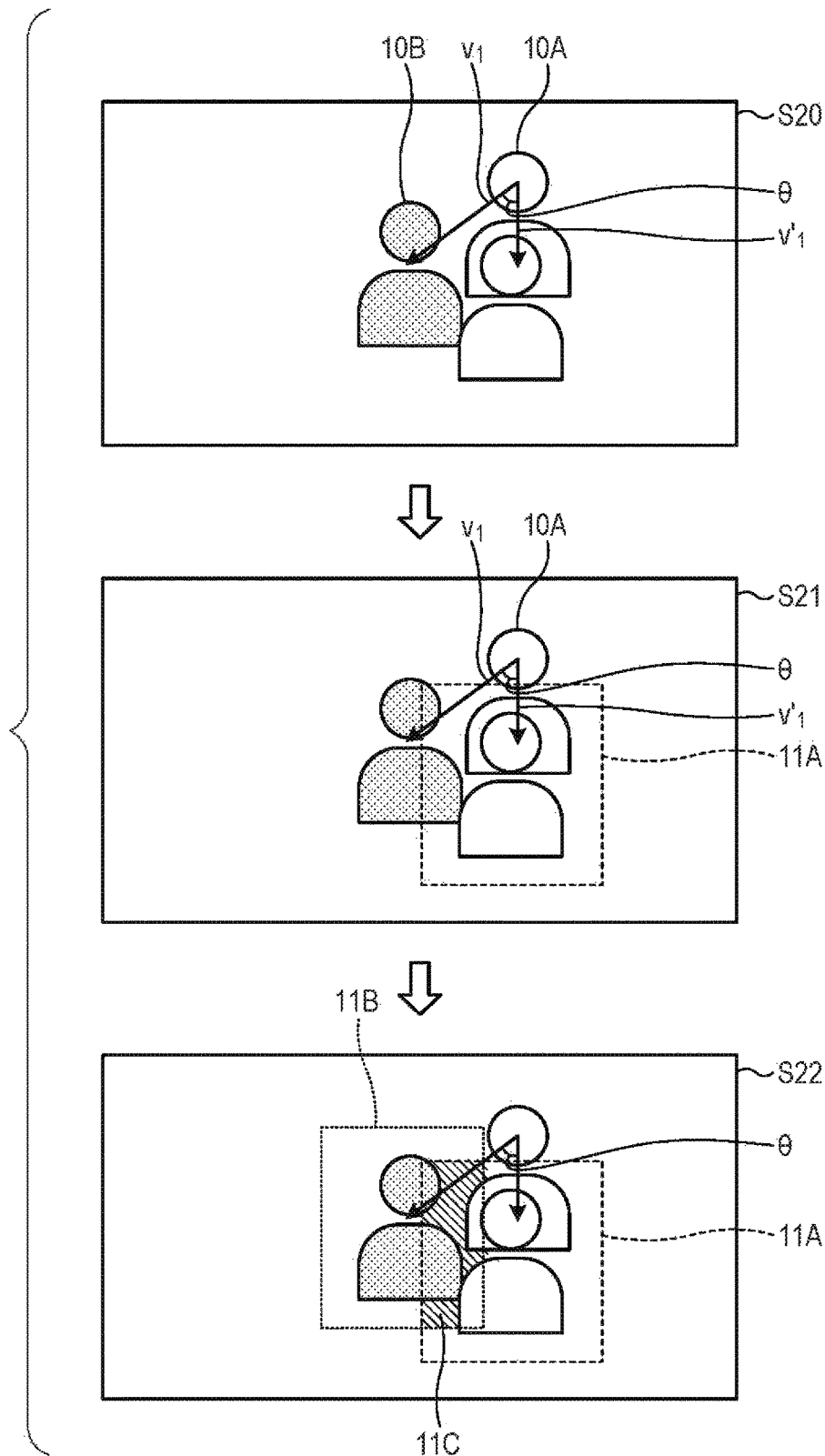
FIG. 14 is a second diagram for describing the process of the change unit.

FIG. 14 is a second diagram for describing a process of the change unit. In the description of FIG. 14, it is assumed that the person who overtakes is the person 10A and the person who is overtaken is the person 10B. It is assumed that a velocity vector (movement amount) of the person 10A before the position is changed is a velocity vector $v_1$ and a velocity vector thereof after the position is changed is a velocity vector $v_1'$.

Step S20 of FIG. 14 will be described. The change unit 154 sets the velocity vector $v_1'$ by changing an orientation of the velocity vector $v_1$ to a direction in which the person 10A is separated from the person 10B. Magnitudes of the velocity vector $v_1$ and the velocity vector $v_1'$ are equal to each other but orientations thereof are different from each other. In the example illustrated in FIG. 14, an angle formed by the velocity vector $v_1$ and the velocity vector $v_1'$ is $\theta$.

Step S21 of FIG. 14 will be described. The change unit 154 recalculates the position coordinates of the person 10A in the next frame by using the movement amount of the person 10A as the velocity vector $v_1'$, and resets the search range 11A. The process of calculating the position coordinates of the person 10A and the process of setting the search range which are performed based on the movement amount by the change unit 154 are the same as the process of calculating the position coordinates and the process of setting the search range which are performed by the range specifying unit 153 described above.

Step S22 of FIG. 14 will be described. The change unit 154 specifies an overlapping region 11C of a newly set search range 11A and the search range 11B of the person 10B.

The change unit 154 repeatedly performs the process (steps S20 to S22) of changing the direction of the velocity vector $v_1$ and resetting the search range 11A until the horizontal width w of the overlapping region 11C is equal to or less than $w_0$ or the vertical width of the overlapping region 11C is equal to or less than $h_0$. In a case where there is a plurality of velocity vectors satisfying that the horizontal width w of the overlapping region 11C is equal to or less than $w_0$ or the vertical width h of the overlapping region 11C is equal to or less than $h_0$, the change unit 154 specifies the velocity vector $v_1'$ satisfying that an angle θ formed by the original velocity vector and the changed velocity vector is minimized. The change unit 154 determines the search range 11A based on the specified velocity vector $v_1'$ satisfying that the angle θ is minimized, as the changed search range 11A.

The change unit 154 outputs information acquired by correlating the person ID and the search range of the next frame to the region specifying unit 155. For example, it is assumed that the next frame is the frame of the time t.

The change unit 154 acquires information acquired by correlating the time of the frame, the person IDs corresponding to the group of person regions, and the degree of similarity from the similarity degree calculation unit 152, and performs the following process in a case where the degree of similarity of each person ID is less than a threshold. Here, for the sake of convenience in the description, it is assumed that the persons corresponding to the person IDs are the persons 10A and 10B. In a case where the degree of similarity between the person region of the person 10A and the person region of the person 10B in the time t−1 is less than a threshold, the change unit 154 skips the process illustrated in steps S20 to S22 of FIG. 14, and maintains the search range 11A of the person 10A and the search range 11B of the person 10B before the positions are changed. The change unit 154 outputs information acquired by correlating the person IDs and the search ranges of the next frame to the region specifying unit 155.

The region specifying unit 155 is a processing unit that specifies the regions of the persons from the search ranges set in the next frame. The region specifying unit 155 tracks the same person by using the features of the persons acquired from the past frame. Here, for the sake of convenience in the description, a case where the region of the person 10A is specified from the search range 11A of the person 10A set in the frame of the time t will be described. A case where the region of the person 11B is specified from the search range 11B of the person 10B set in the frame of the time t will be described.

Figure 15:
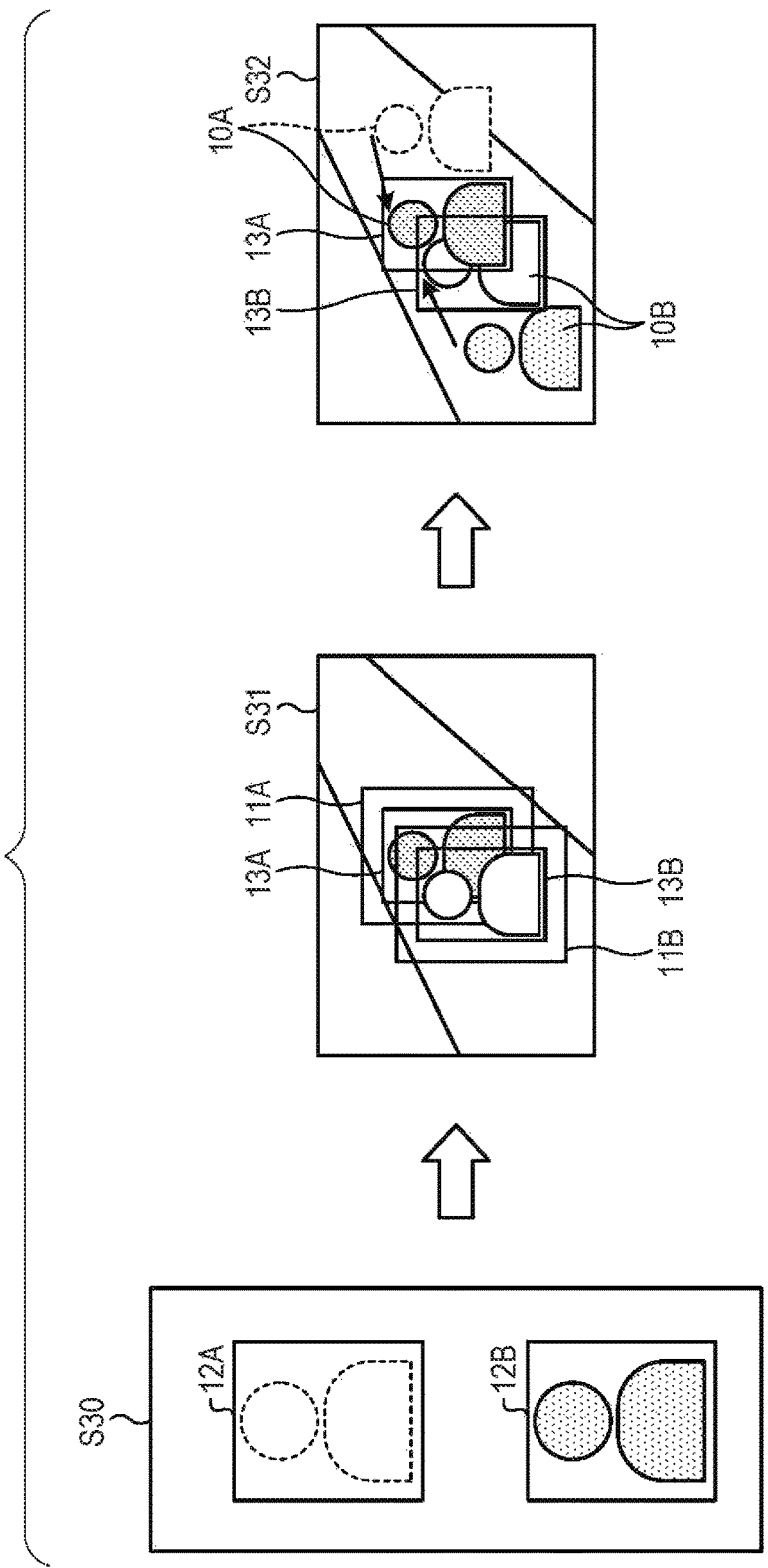
FIG. 15 is a diagram for describing a process of a region specifying unit.

FIG. 15 is a diagram for describing a process of the region specifying unit. Step S30 of FIG. 15 will be described. The region specifying unit 155 acquires a template 12A of the person 10A based on the image table 141 and the tracking table 142. For example, the region specifying unit 155 acquires information of the person region corresponding to the time "t−1" of the person ID "10A" by referring to the tracking table 142. As described in FIG. 8, the information of the person region includes the x coordinate, the y coordinate, the width, and the height. Subsequently, the region specifying unit 155 acquires the template 12A by extracting an image of the person region of the person 10A from the frame of the time "t−1" of the image table 141.

Similarly, the region specifying unit 155 acquires a template 12B of the person 10B based on the image table 141 and the tracking table. For example, the region specifying unit 155 acquires information of the person region corresponding to the time "t−1" of the person ID "10B" by referring to the tracking table 142. Subsequently, the region specifying unit 155 acquires the template 12B by extracting an image of the person region of the person 10B from the frame of the time "t−1" of the image table 141.

Step S31 of FIG. 15 will be described. The region specifying unit 155 disposes the template 12A on the search range 11A, and repeatedly performs the process of calculating the degree of similarity while moving the position of the template 12A.

For example, the region specifying unit 155 calculates the degree of similarity between a region of the search range 11A overlapping the template and the template by Expression (20). T'(x, y) of Expression (20) indicates a pixel value of the coordinates (x, y) included in a template T'. I'(x, y) indicates a pixel value of the coordinates (x, y) included a region F of the search range overlapping the template. h corresponds to a height of the template T'. w corresponds to a width of the template T'.

$$R(x, y) = \frac{\sum_{y'=0}^{h-1} \sum_{x'=0}^{w-1} T'(x', y') I'(x+x', y+y')}{\sqrt{\sum_{y'=0}^{h-1} \sum_{x'=0}^{w-1} T'(x', y')^2 \sum_{y'=0}^{h-1} \sum_{x'=0}^{w-1} I'(x+x', y+y')^2}} \quad (20)$$

The region specifying unit 155 sets the region I' in which the degree of similarity R is largest, as a region 13A by comparing the search range with the template 12A. In this case, the region specifying unit 155 specifies the region I' as, the person region 13A of the person 10A in the time t.

Similarly, the region specifying unit 155 disposes the template 12B on the search range 11B, and repeatedly performs the process of calculating the degree of similarity while moving the position of the template 12B. The region specifying unit 155 sets a region F in which the degree of similarity R is largest, as a region 13B by comparing the search range with the template 12B. In this case, the region specifying unit 155 specifies the region I' as the person region 13B of the person 10B in the time t.

Step S32 of FIG. 15 will be described. The region specifying unit 155 determines that the person 10A in the time t−1 moves to the person region 13A in the time t. The region specifying unit 155 correlates the person ID "10A", the time "t", the information of the person region 13A, and the movement amount of the person 10A, and registers the correlated items in the tracking table 142.

The region specifying unit 155 determines that the person 10B in the time t−1 moves to the person region 13B in the time t. The region specifying unit 155 correlates the person ID "10B", the time "t", the information of the person region 13B, and the movement amount of the person 10B, and registers the correlated items in the tracking table 142.

FIG. 6 will be described again. The detection unit 156 is a processing unit that detects the person from the frame of the time t. The detection unit 156 determines whether or not the detected person is the person as the tracking target, and adds the information of the detected person as a new person as the tracking target to the tracking table 142 in a case where the detected person is not the person as the tracking target.

Figure 16:
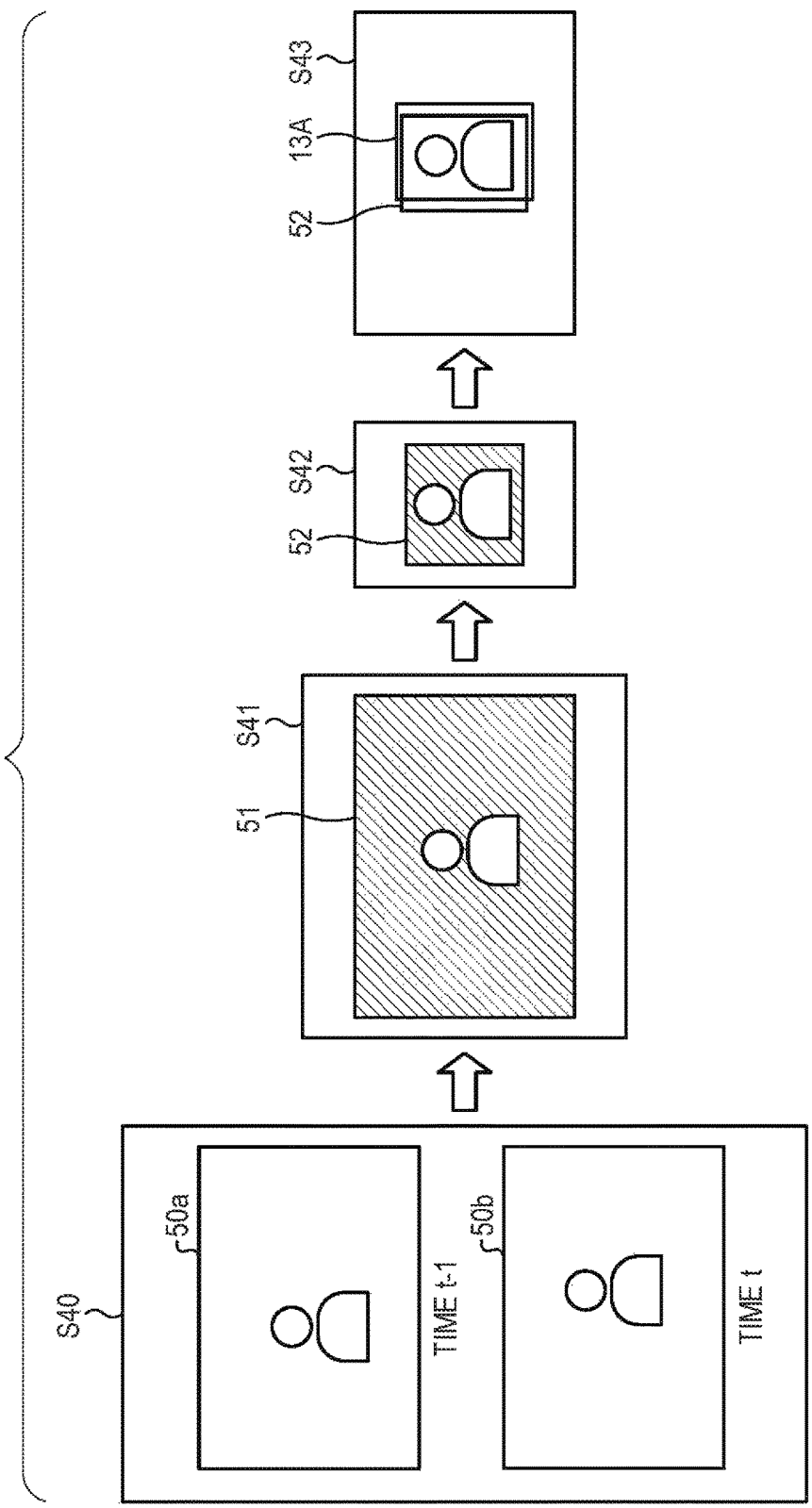
FIG. 16 is a diagram for describing a process of a detection unit.

FIG. 16 is a diagram for describing a process of the detection unit. Step S40 of FIG. 16 will be described. The detection unit 156 acquires a frame 50*a* of the time t−1 and a frame 50*b* of the time t by referring to the image table 141.

Step S41 of FIG. 16 will be described. The detection unit 156 generates a background difference image 51 between the frame 50*a* and the frame 50*b*.

Step S42 of FIG. 16 will be described. The detection unit 156 generates, in advance, a classifier for the person by using a histograms of oriented gradients (HOG) feature. The detection unit 156 compares the classifier with the background difference image 51, and determines whether or not the region of the person is included in the background difference image 51. The detection unit 156 outputs a person region candidate 52 in a case where the region of the person is included in the background difference image 51.

Step S43 of FIG. 16 will be described. The detection unit 156 specifies the person region of the person as the tracking target in the time t based on the tracking table 142. Here, for the sake of convenience in the description, it is assumed that the person region specified based on the tracking table 142 is the person region 13A of the person 10A. The detection unit 156 calculates an overlap rate of the person region 13A and the person region candidate 52.

In a case where the overlap rate of the person region 13A and the person region candidate 52 is equal to or greater than a predetermined overlap rate, the detection unit 156 determines that the person region candidate 52 corresponds to the person region 13A, and skips the process of adding the person region candidate to the tracking table 142.

In a case where the overlap rate of the person region 13A and the person region candidate 52 is less than the predetermined overlap rate, the detection unit 156 determines that the person region candidate 52 does not correspond to the person region 13A. In a case where it is determined that the person region candidate 52 does not corresponds to each person region of the tracking table 142, the detection unit 156 newly registers information of the person region candidate 52 in the tracking table 142. For example, the detection unit 156 assigns a unique person ID, correlates the person ID, a time t, an x coordinate and a y coordinate of the person region candidate, a width, and a height, and registers the correlated items in the tracking table 142.

Figure 17:
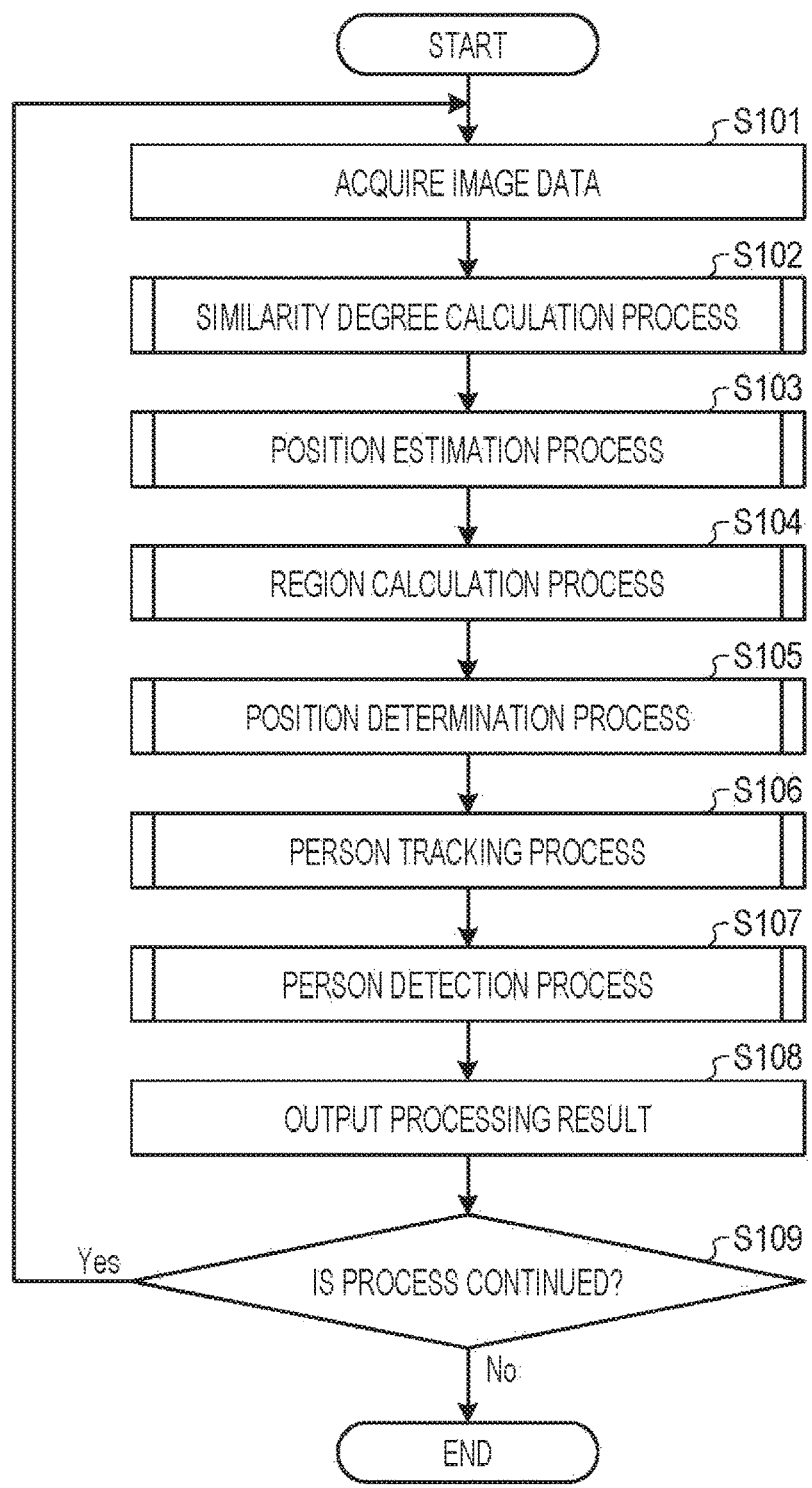
FIG. 17 is a flowchart illustrating a processing procedure of the image processing apparatus according to the present embodiment.

Next, a processing procedure of the image processing apparatus 100 according to the present embodiment will be described. FIG. 17 is a flowchart illustrating the processing procedure of the image processing apparatus according to the present embodiment. As illustrated in FIG. 17, the acquisition unit 151 of the image processing apparatus 100 acquires the image data from the camera 110 (step S101).

The similarity degree calculation unit 152 of the image processing apparatus 100 performs a similarity degree calculation process (step S102). The range specifying unit 153 of the image processing apparatus 100 performs the position estimation process (step S103). The range specifying unit 153 performs a region calculation process (step S104).

The change unit 154 of the image processing apparatus 100 performs a position determination process (step S105). The region specifying unit 155 of the image processing apparatus 100 performs a person tracking process (step S106). The detection unit 156 of the image processing apparatus 100 performs a person detection process (step S107).

The control unit 150 of the image processing apparatus 100 outputs the processing result (step S108). The image processing apparatus 100 determines whether or not to continue the process (step S109). In a case where the control unit continues the process (step S109, Yes), the image processing apparatus 100 proceeds to step S101. In a case where the control unit does not continue the process (step S109, No), the image processing apparatus 100 ends the process.

Figure 18:
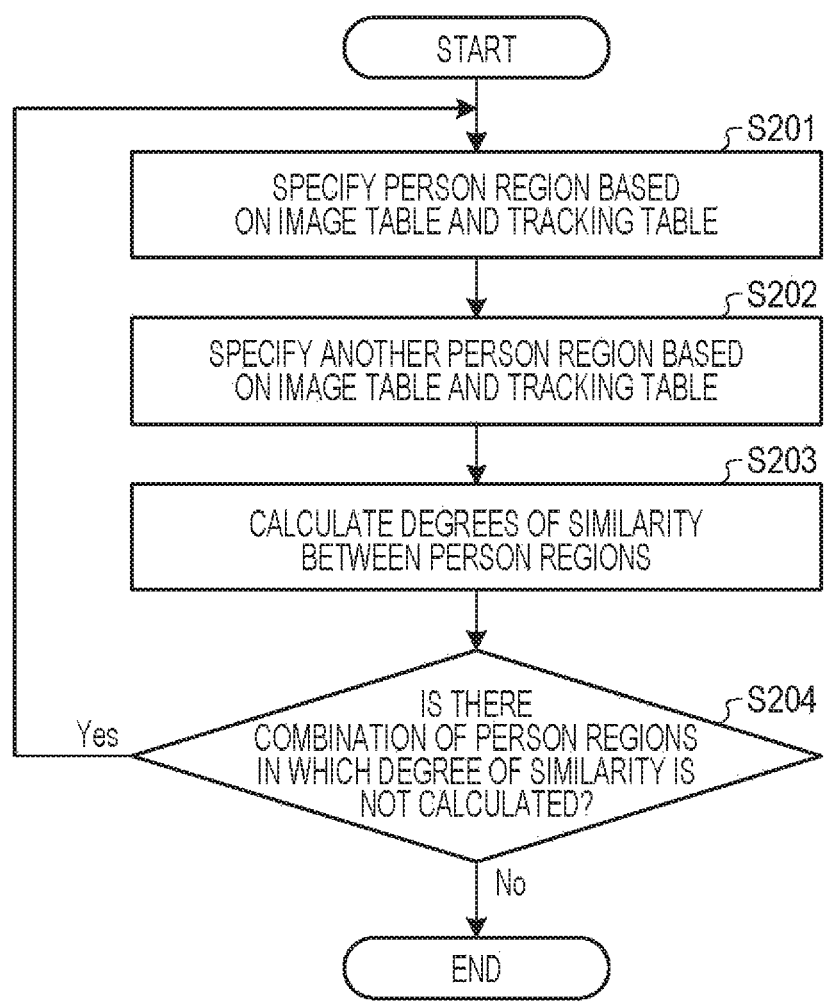
FIG. 18 is a flowchart illustrating a processing procedure of a similarity degree calculation process.

The similarity degree calculation process illustrated in step S102 of FIG. 17 will be described. FIG. 18 is a flowchart illustrating a processing procedure of the similarity degree calculation process. As illustrated in FIG. 18, the similarity degree calculation unit 152 specifies the person region based on the image table 141 and the tracking table 142 (step S201).

The similarity degree calculation unit 152 specifies a person region of another person based on the image table 141 and the tracking table 142 (step S202). The similarity degree calculation unit 152 calculates the degrees of similarity between the person regions (step S203).

The similarity degree calculation unit 152 determines whether or not a combination of the person regions in which the degree of similarity is not calculated is present (step S204). In a case where the combination of the person regions in which the degree of similarity is not calculated is present (step S204, Yes), the similarity degree calculation unit 152 proceeds to step S201. Meanwhile, in a case where the combination of the person regions in which the degree of similarity is not calculated is not present (step S204, No), the similarity degree calculation unit 152 ends the similarity degree calculation process.

Figure 19:
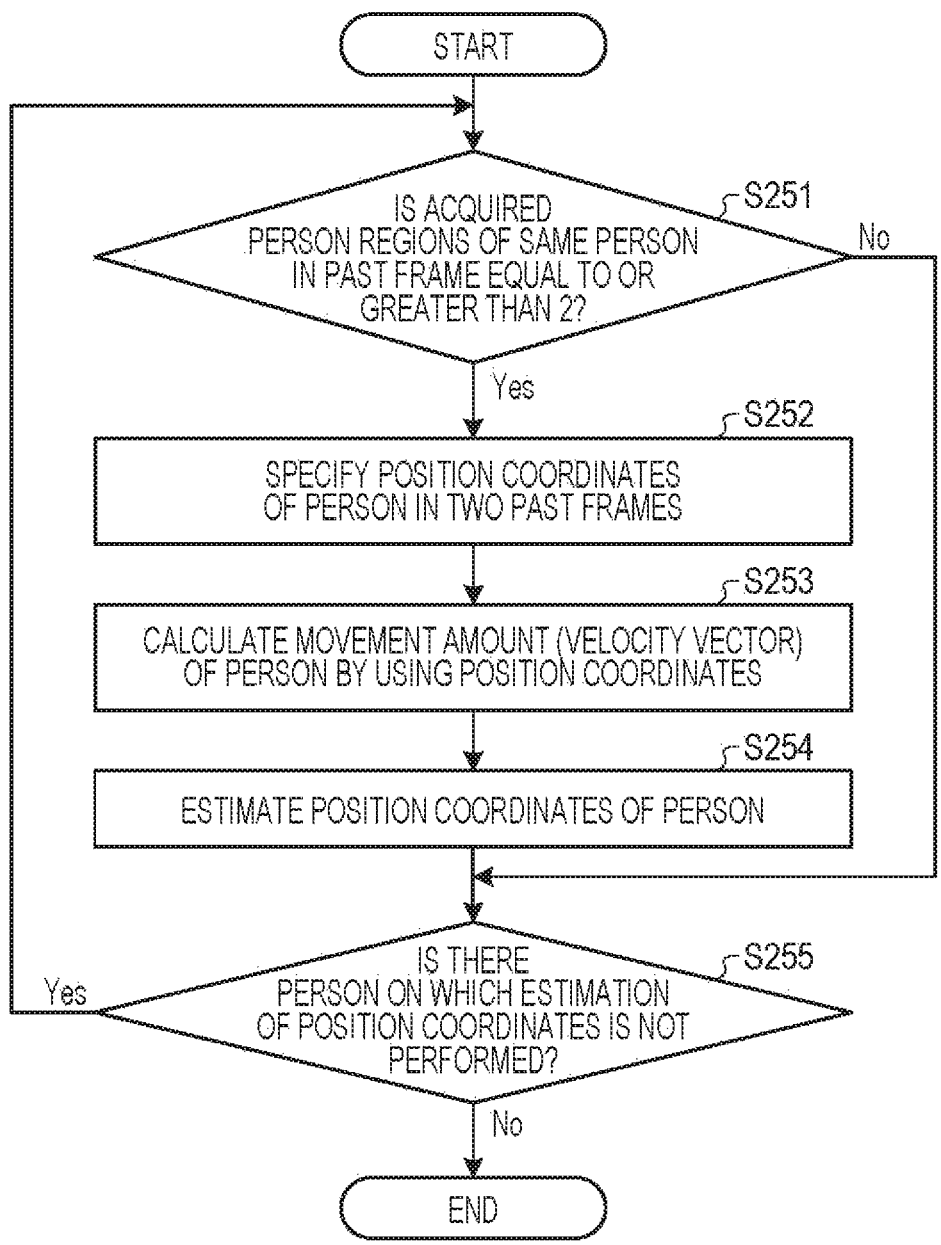
FIG. 19 is a flowchart illustrating a processing procedure of a position estimation process.

The position estimation process illustrated in step S103 of FIG. 17 will be described. FIG. 19 is a flowchart illustrating a processing procedure of the position estimation process. As illustrated in FIG. 19, the range specifying unit 153 determines whether or not the person region of the same person acquired in the past frame is equal to or greater than 2 (step S251). In a case where the person region of the same person acquired in the past frame is not equal to or greater than 2 (step S251, No), the range specifying unit 153 proceeds to step S255. Meanwhile, in a case where the person region of the same person acquired in the past frame is equal to or greater than 2 (step S251, Yes), the range specifying unit 153 proceeds to step S252.

The range specifying unit 153 specifies the position coordinates of the person in the two past frames (step S252). The range specifying unit 153 calculates the movement amount (velocity vector) of the person by using the position coordinates (step S253).

The range specifying unit 153 estimates the position coordinates of the person (step S254). For example, the range specifying unit 153 calculates the velocity vector based on the position coordinates of the person in the times t−1 and t−2, and estimates the position coordinates of the person in the time t.

The range specifying unit 153 determines whether or not there is a person of which the position coordinates are not estimated (step S255). In a case where there is a person of which the position coordinates are not estimated (step S255, Yes), the range specifying unit 153 proceeds to step S251. Meanwhile, in a case where there is no person of which the position coordinates are not estimated (step S255, No), the range specifying unit 153 ends the position estimation process.

Figure 20:
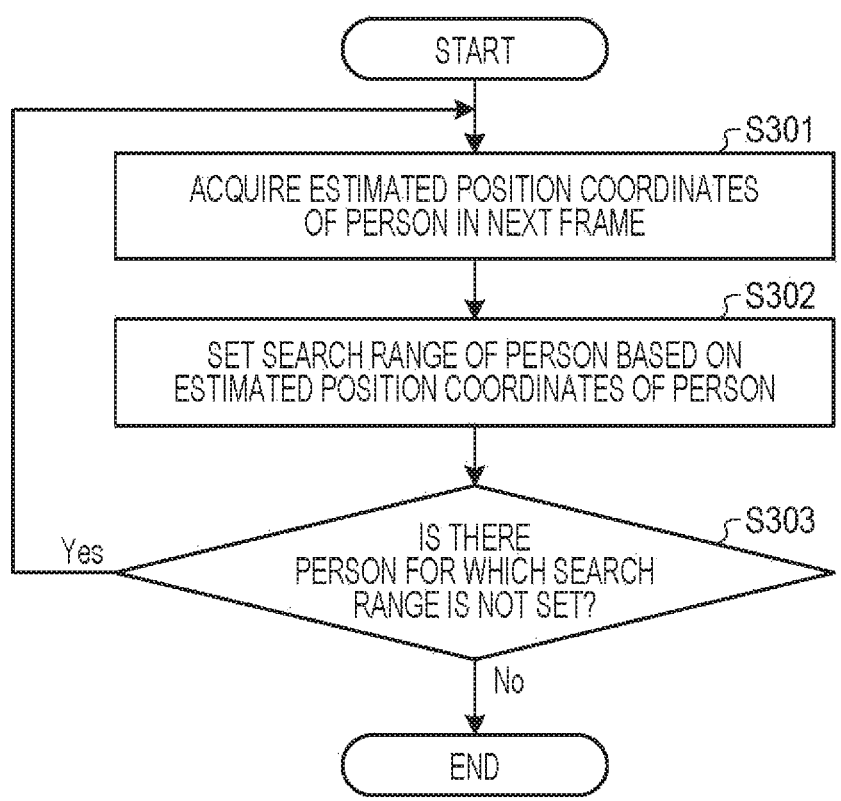
FIG. 20 is a flowchart illustrating a processing procedure of a region calculation process.

The region calculation process illustrated in step S104 of FIG. 17 will be described. FIG. 20 is a flowchart illustrating a processing procedure of the region calculation process. As illustrated in FIG. 20, the range specifying unit 153 acquires the estimated position coordinates of the person in the next frame (the frame of the time t) (step S301). The range specifying unit 153 sets the search range of the person based on the estimated position coordinates of the person (step S302).

The range specifying unit 153 determines whether or not there is a person for which the search range is not set (step S303). In a case where there is a person to which the search range is not set (step S303, Yes), the range specifying unit 153 proceeds to step S301. In a case where there is no person to which the search range is not set (step S303, No), the range specifying unit 153 ends the region calculation process.

Figure 21:
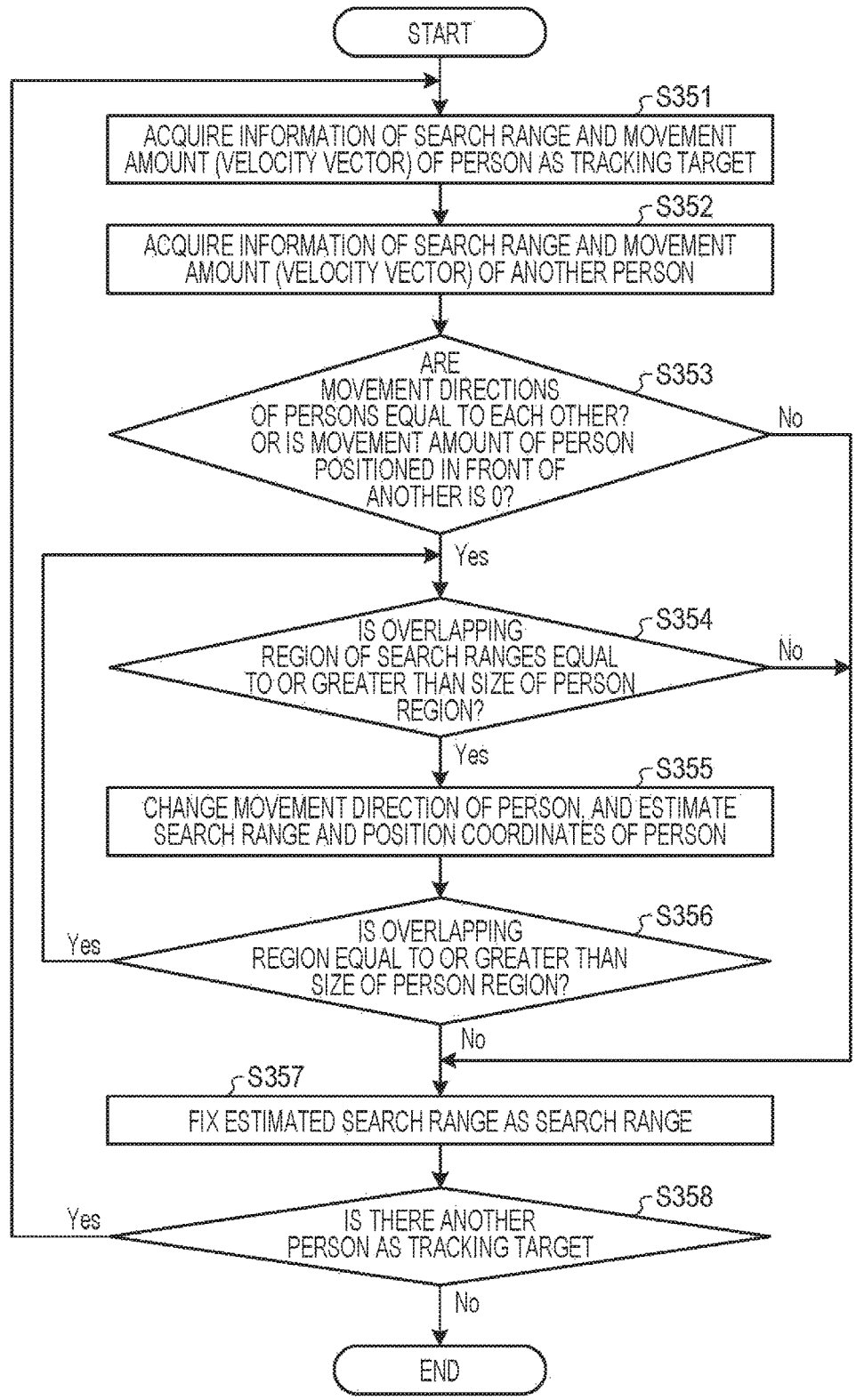
FIG. 21 is a flowchart illustrating a processing procedure of a position determination process.

The position determination process illustrated in step S105 of FIG. 17 will be described. FIG. 21 is a flowchart illustrating a processing procedure of the position determination process. As illustrated in FIG. 21, the change unit 154 acquires information of the search range and the movement amount (velocity vector) of the person as the tracking target (step S351). The change unit 154 acquires information of a search range and a movement amount (velocity vector) of another person (step S352).

The change unit 154 determines whether or not the movement directions of the persons are substantially the same (a difference between the directions of the velocity vectors is less than a threshold) or the movement amount of the person positioned in front of the other person is substantially 0 (an absolute value of the velocity vector is less than a threshold) (step S353). In a case where the movement directions of the persons are substantially the same or the movement amount of the person positioned in front of the other person is substantially 0 (step S353, Yes), the change unit 154 proceeds to step S354. Meanwhile, in a case where the movement directions of the person are not the same or the movement amount of the person positioned in front of the other person is not 0 (step S353, No), the change unit 154 proceeds to step S357.

The change unit 154 determines whether or not the overlapping region of the search ranges is equal to or greater than the size of the person region (step S354). In a case where the overlapping region of the search ranges is equal to or greater than the size of the person region (step S354, Yes), the change unit 154 proceeds to step S355. Meanwhile, in a case where the overlapping region of the search ranges is not equal to or greater than the size of the person region (step S354, No), the change unit 154 proceeds to step S357.

The change unit 154 changes the movement direction of the person, and estimates the position coordinates and the search range of the person (step S355). The change unit 154 determines whether or not the overlapping region is equal to or greater than the size of the person region (step S356). In a case where the overlapping region is equal to or greater than the size of the person region (step S356, Yes), the change unit 154 proceeds to step S354.

In a case where the overlapping region is not equal to or greater than the size of the person region (step S356, No), the change unit 154 fixes the estimated search range as the search range of the person (step S357). In step S357, the change unit 154 fixes the search range based on the velocity vector satisfying that an angle θ formed by the vector velocity before the position is changed and the velocity vector after the position is changed is minimized, among the velocity vectors after the positions are changed, which satisfy that the condition of step S356 is No, as the changed search range.

The change unit 154 determines whether or not there is another person as the tracking target (step S358). In a case where there is another person as the tracking person (step S358, Yes), the change unit 154 proceeds to step S351. In a case where there is not another person as the tracking person (step S358, No), the change unit 154 ends the position determination process.

Figure 22:
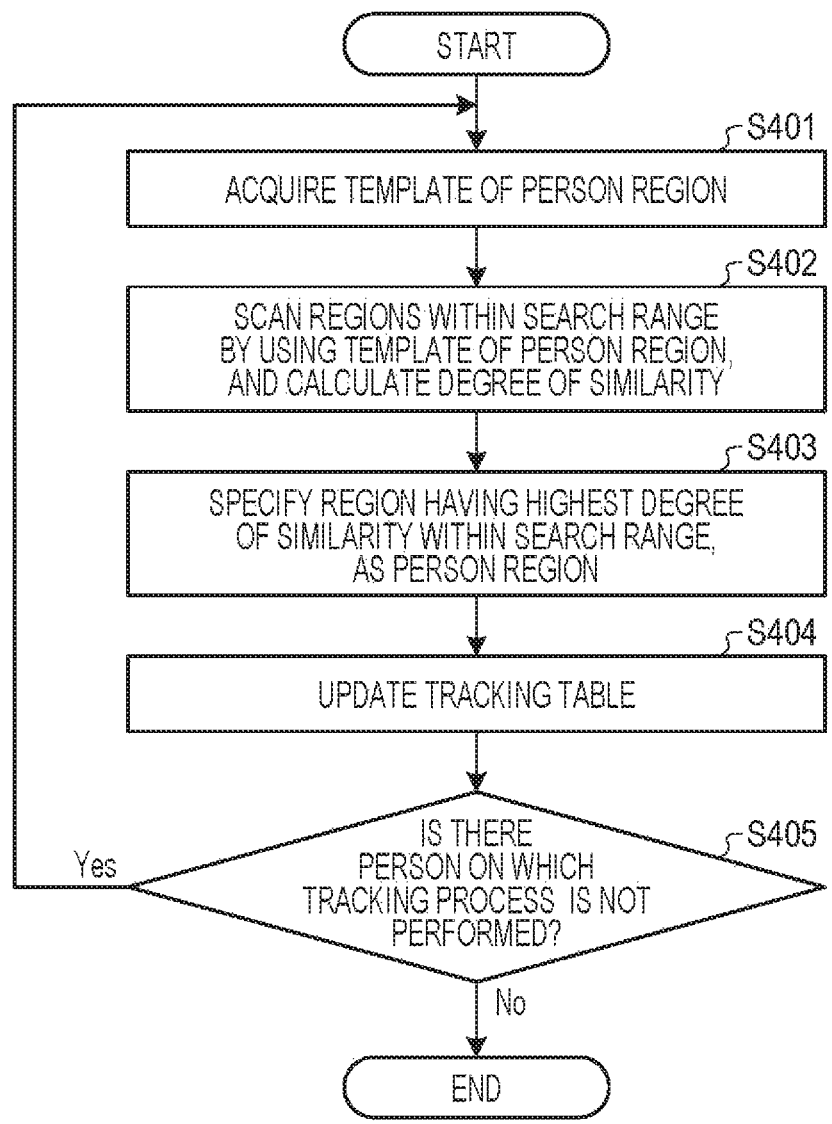
FIG. 22 is a flowchart illustrating a processing procedure of a person tracking process.

The person tracking process illustrated in step S106 of FIG. 17 will be described. FIG. 22 is a flowchart illustrating a processing procedure of the person tracking process. As illustrated in FIG. 22, the region specifying unit 155 acquires the template of the person region (step S401).

The region specifying unit 155 scans the region within the search range by using the template of the person region, and calculates the degree of similarity (step S402). The region specifying unit 155 specifies the region having the highest degree of similarity within the search range, as the person region (step S403).

The region specifying unit 155 updates the tracking table 142 (step S404). The region specifying unit 155 determines whether or not there is a person on which the tracking process is not performed (step S405). In a case where there is a person on which the tracking process is not performed (step S405, Yes), the region specifying unit 155 proceeds to step S401. In a case where there is a person on which the tracking process is not performed (step S405, No), the region specifying unit 155 ends the person tracking process.

Figure 23:
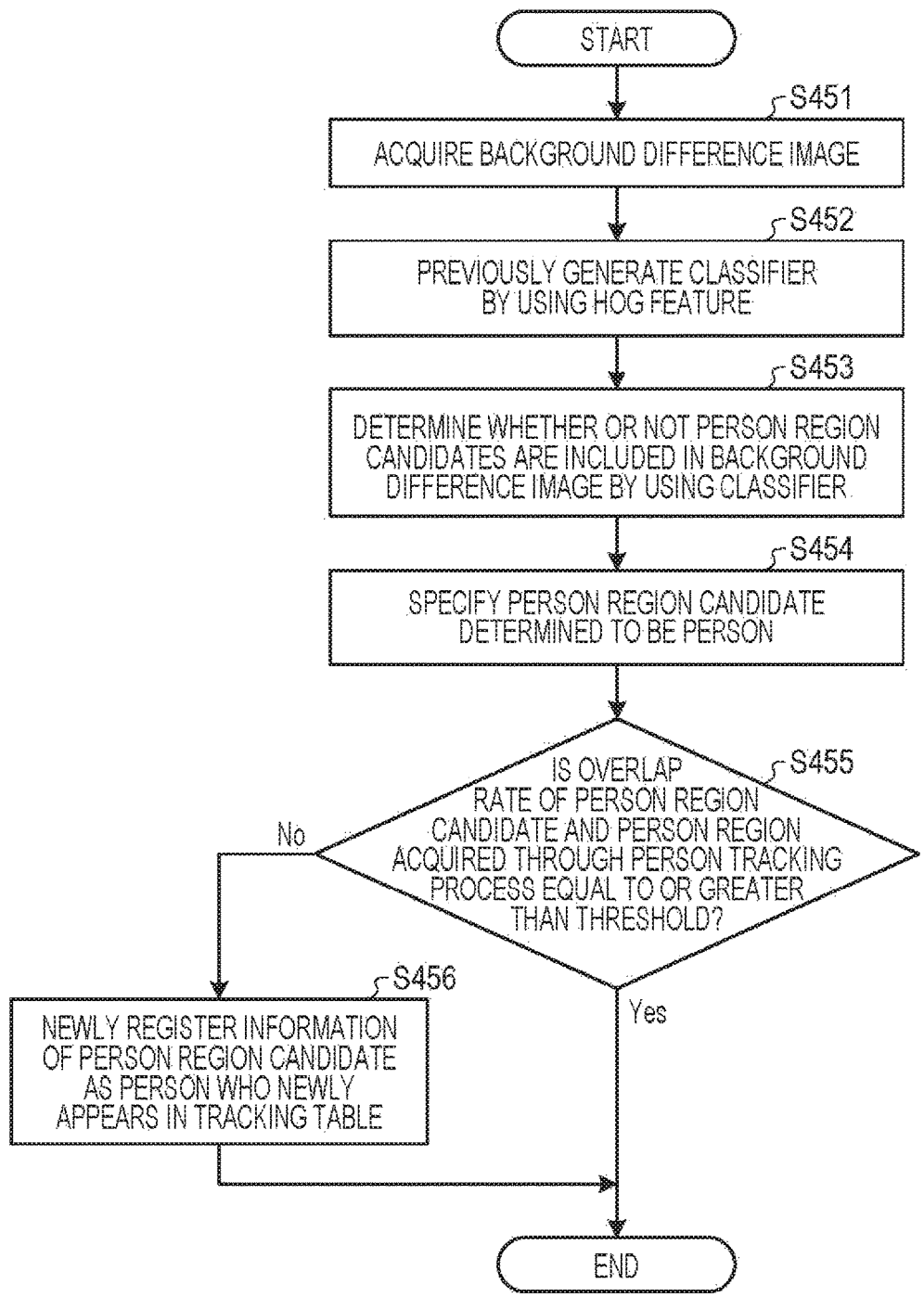
FIG. 23 is a flowchart illustrating a processing procedure of a person detection process.

The person detection process illustrated in step S107 of FIG. 17 will be described. FIG. 23 is a flowchart illustrating a processing procedure of the person detection process. As illustrated in FIG. 23, the detection unit 156 acquires the background difference image (step S451). The detection unit 156 previously generates a classifier by using the HOG feature (step S452).

The detection unit 156 determines whether or not the person region candidate is included in the background difference image by using the classifier (step S453). The detection unit 156 specifies the person region candidate determined to be the person (step S454).

The detection unit 156 determines whether or not the overlap rate of the person region candidate and the person region acquired through the person tracking process is equal to or greater than a threshold (step S455). In a case where the overlap rate of the person region candidate and the person region acquired through the person tracking process is not equal to or greater than the threshold (step S455, No), the detection unit 156 registers information of the person region candidate as a person who newly appears in the tracking table 142 (step S456).

Meanwhile, in a case where the overlap rate of the person region candidate and the person region acquired through the person tracking process is equal to or greater than the threshold (step S455, Yes), the detection unit 156 ends the person detection process.

Next, advantages of the image processing apparatus 100 according to the present embodiment will be described. In a case where an area in which a first search range of a first person and a second search range of a second person overlap each other is equal to or greater than a predetermined value, the image processing apparatus 100 changes the first search range and/or the second search range such that the overlapping area is less than the predetermined value. The image processing apparatus 100 specifies the region of the first person from the first search range in the next frame, and specifies the region of the second person from the second search range in the next frame. Thus, it is possible to reduce erroneous determination of the position of the target.

The image processing apparatus 100 specifies the first search range by calculating a first velocity vector based on a movement history of the first person in the past frame. The image processing apparatus 100 specifies the second search range by calculating a second velocity vector based on a movement history of the second person in the past frame. Accordingly, it is possible to calculate the positions of the first person and the second person by using a simple method.

The image processing apparatus 100 specifies the area in which the first search range and the second search range overlap each other while changing the direction of the velocity vector, and specifies a change amount satisfying that a change amount of the direction of the velocity vector is minimized within the range in which the condition in which the overlapping area is less than the predetermined value is satisfied. The image processing apparatus 100 changes the direction of the velocity vector by the specified change amount, and changes the first search range in the next frame. Accordingly, the range in which the search range of the person who overtakes and the search range of the person who is overtaken overlap each other is smaller than the person region, and thus, the switching of the person can be suppressed. As a result, it is possible to appropriately perform the tracking process.

In a case where a degree of similarity between a feature of the first person and a feature of the second person included in the past frame is equal to or greater than a threshold, the image processing apparatus 100 changes the search range in the next frame. Since such switching occurs only in a case where the feature of the first person and the feature of the second person are similar to each other, the process of changing the search range in the next frame is skipped in a case where the features are not similar to each other, and thus, it is possible to reduce a processing load.

In a case where a movement direction of the first person and a movement direction of the second person are substantially the same, the image processing apparatus 100 changes the search range in the first range in the next frame. Here, if the movement direction of the first person and the movement direction of the second person are not substantially the same, since there is no case where the search ranges overlap each other, the process of determining whether or not to change the search range is skipped, and thus, it is possible to reduce the processing load.

Although it has been described in the present embodiment that the person captured by the camera 110 is tracked, the present disclosure is not limited thereto, and may be similarly applied to moving objects such as vehicles or animals.

Figure 24:
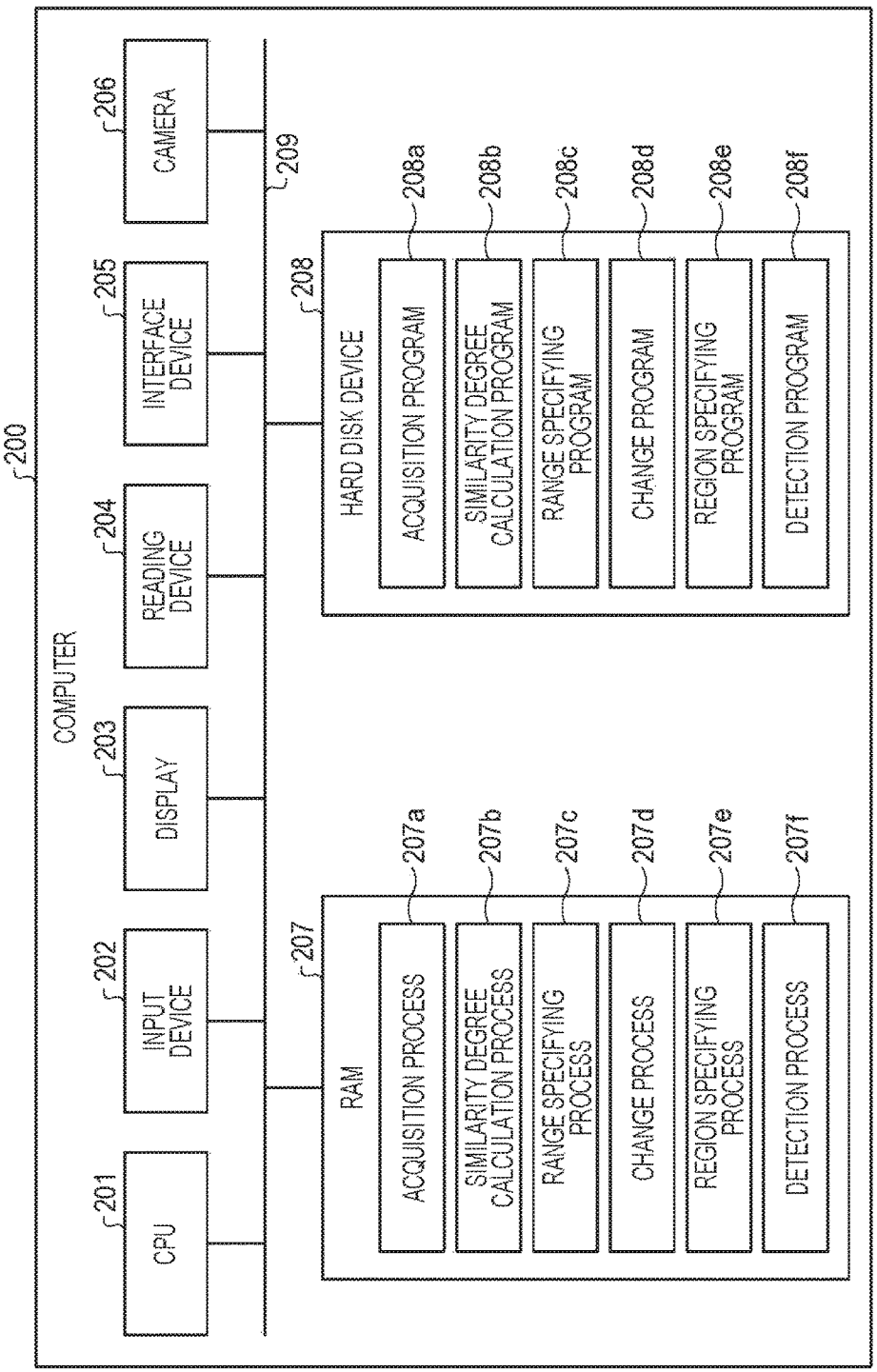
FIG. 24 is a diagram illustrating an example of a hardware configuration of a computer.

Hereinafter, an example of a hardware configuration of a computer that realizes the same functions as those of the image processing apparatus 100 described in the embodiment will be described. FIG. 24 is a diagram illustrating an example of the hardware configuration of the computer.

As illustrated in FIG. 24, a computer 200 includes a CPU 201 that performs various arithmetic processing, an input device 202 that receives an input of data from a user, and a display 203. The computer 200 includes a reading device 204 that reads programs from a storage medium, and an interface device 205 that transmits and receives data to and from another computer via a network. The computer 200 includes a camera 206. The computer 200 includes a RAM 207 that temporarily stores various information items, and a hard disk device 208. The respective devices 201 to 208 are connected to a bus 209.

The hard disk device 208 includes an acquisition program 208a, a similarity degree calculation program 208b, a range specifying program 208c, a change program 208d, a region specifying program 208e, and a detection program 208f. The CPU 201 reads the acquisition program 208a, the similarity degree calculation program 208b, the range specifying program 208c, the change program 208d, the region specifying program 208e, or the detection program 208f, and loads the read program into the RAM 207.

The acquisition program 208a functions as an acquisition process 207a. The similarity degree calculation program 208b functions as a similarity degree calculation process 207b. The range specifying program 208c functions as a range specifying process 207c. The change program 208d functions as a change process 207d. The region specifying program 208e functions as a range specifying process 207e. The detection program 208f functions as a detection process 207f.

For example, a process of the acquisition process 207a corresponds to the process of the acquisition unit 151. A process of the similarity degree calculation process 207b corresponds to the process of the similarity degree calculation unit 152. A process of the range specifying process 207c corresponds to the process of the range specifying unit 153. A process of the change process 207d corresponds to the process of the change unit 154. A process of the range specifying process 207e corresponds to the process of the region specifying unit 155. A process of the detection process 207f corresponds to the process of the detection unit 156.

The respective programs 208a to 208f may not be necessarily stored in the hard disk device 208 at an initial stage. For example, the respective programs are stored in a "portable physical medium" such as a flexible disk (FD), CD-ROM, a DVD disc, a magneto-optical disc, or an IC card to be inserted to the computer 200. The computer 200 may read the respective programs 208a to 208f, and may execute the read program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable non-transitory storage medium storing an image processing program causing a computer to perform processes of:

specifying a first range in which a first target is searched for and a second range in which a second target is searched for in a next frame by referring to a storage device that stores past frames captured by a capturing device, in a case where a first region corresponding to the first target and a second region corresponding to the second target are extracted from a preceding frame captured by the capturing device;

changing at least one of the first range and the second range in the next frame such that an area in which the first range and the second range specified in the next frame overlap each other is less than a predetermined value, in a case where the overlapping area is equal to or greater than the predetermined value; and searching for the first target in the first range and the second target in the second range, wherein at least one of the first range and the second range is changed by the changing, and specifying a region corresponding to the first target and a region corresponding to the second target in the next frame.

2. The storage medium according to claim 1,
wherein, in the process of specifying the ranges, the first range is specified by calculating a first velocity vector based on a movement history of the first target in the past frames and the second range is specified by calculating a second velocity vector based on a movement history of the second target in the past frames.

3. The storage medium according to claim 2,
wherein, in the process of changing the ranges, the first range in the next frame is changed by specifying the area in which the first range and the second range overlap each other while changing a direction of the first velocity vector, specifying a change amount satisfying that the change amount of the direction of the first velocity vector is minimized in a range in which a condition in which the overlapping area is less than the predetermined value is satisfied, and changing a direction of the first velocity vector by the specified change amount.

4. The storage medium according to claim 1,
wherein, in the process of changing the ranges, the at least one of the first range and the second range in the next frame is changed in a case where a degree of similarity between a first feature of the first target and a second feature of the second target included in the preceding frame is equal to or greater than a threshold.

5. The storage medium according to claim 1,
wherein, in the process of changing the ranges, the at least one of the first range and the second range in the next frame is changed in a case where a difference between a movement direction of the first target and a movement direction of the second target is less than a predetermined threshold.

6. An image processing method performed by a computer, the method comprising:
specifying a first range in which a first target is searched for and a second range in which a second target is searched for in a next frame by referring to a storage device that stores past frames captured by a capturing device, in a case where a first region corresponding to the first target and a second region corresponding to the second target are extracted from a preceding frame captured by the capturing device;
changing at least one of the first range and the second range in the next frame such that an area in which the first range and the second range specified in the next frame overlap each other is less than a predetermined value in a case where the overlapping area is equal to or greater than the predetermined value; and
searching for the first target in the first range and the second target in the second range, wherein at least one of the first range and the second range is changed by the changing, and specifying a region corresponding to the first target and a region corresponding to the second target in the next frame.

7. The image processing method according to claim 6,
wherein, in the process of specifying the ranges, the first range is specified by calculating a first velocity vector based on a movement history of the first target in the past frames and the second range is specified by calculating a second velocity vector based on a movement history of the second target in the past frames.

8. The image processing method according to claim 7,
wherein, in the process of changing the ranges, the first range in the next frame is changed by specifying the area in which the first range and the second range overlap each other while changing a direction of the first velocity vector, specifying a change amount satisfying that the change amount of the direction of the first velocity vector is minimized in a range in which a condition in which the overlapping area is less than the predetermined value is satisfied, and changing a direction of the first velocity vector by the specified change amount.

9. The image processing method according to claim 6,
wherein, in the process of changing the ranges, the at least one of the first range and the second range in the next frame is changed in a case where a degree of similarity between a first feature of the first target and a second feature of the second target included in the preceding frame is equal to or greater than a threshold.

10. The image processing method according to claim 6,
wherein, in the process of changing the ranges, the at least one of the first range and the second range in the next frame is changed in a case where a difference between a movement direction of the first target and a movement direction of the second target is less than a predetermined threshold.

11. An image processing apparatus comprising:
a memory, and
a processor coupled to the memory and configured to execute a process comprising:
specifying a first range in which a first target is searched for and a second range in which a second target is searched for in a next frame by referring to a storage device that stores past frames captured by a capturing device in a case where a first region corresponding to the first target and a second region corresponding to the second target are extracted from a preceding frame captured by the capturing device;
changing at least one of the first range and the second range in the next frame such that an area in which the first range and the second range specified in the next frame overlap each other is less than a predetermined value in a case where the overlapping area is equal to or greater than the predetermined value; and
searching for the first target in the first range and the second target in the second range, wherein at least one of the first range and the second range is changed by the changing, and specifying a region corresponding to the first target and a region corresponding to the second target in the next frame.

12. The image processing apparatus according to claim 11,
wherein in the process of specifying, the first range is specified by calculating a first velocity vector based on a movement history of the first target in the past frames, and the second range is specified by calculating a second velocity vector based on a movement history of the second target in the past frames.

13. The image processing apparatus according to claim 12,
wherein in the process of changing, the first range in the next frame is changed by specifying the area in which the first range and the second range overlap each other while changing a direction of the first velocity vector, by specifying a change amount satisfying that the change amount of the direction of the first velocity vector is minimized in a range in which a condition in which the overlapping area is less than the predetermined value is satisfied, and by changing a direction of the first velocity vector by the specified change amount.

14. The image processing apparatus according to claim 11,
wherein in the process of changing, the at least one of the first range and the second range in the next frame are changed in a case where a degree of similarity between a first feature of the first target and a second feature of the second target included in the preceding frame is equal to or greater than a threshold.

15. The image processing apparatus according to claim 11,
wherein in the process of changing, the at least one of the first range and the second range in the next frame are changed in a case where a difference between a movement direction of the first target and a movement direction of the second target is less than a predetermined threshold.

* * * * *